(12) United States Patent
Liu et al.

(10) Patent No.: US 10,498,236 B2
(45) Date of Patent: Dec. 3, 2019

(54) TWO-PHASE THREE-LEVEL CONVERTER AND CONTROLLER THEREFOR

(71) Applicants: Tianshu Liu, Markham (CA); Yan-Fei Liu, Kingston (CA)

(72) Inventors: Tianshu Liu, Markham (CA); Yan-Fei Liu, Kingston (CA)

( * ) Notice: Subject to any disclaimer, the term of this patent is extended or adjusted under 35 U.S.C. 154(b) by 103 days.

(21) Appl. No.: 15/481,244

(22) Filed: Apr. 6, 2017

(65) Prior Publication Data

US 2017/0324326 A1 Nov. 9, 2017

Related U.S. Application Data

(60) Provisional application No. 62/321,027, filed on Apr. 11, 2016, provisional application No. 62/473,464, filed on Mar. 19, 2017.

(51) Int. Cl.
*H02M 1/08* (2006.01)
*H02M 3/158* (2006.01)

(52) U.S. Cl.
CPC ............. *H02M 3/158* (2013.01); *H02M 1/08* (2013.01)

(58) Field of Classification Search
CPC ........ H02M 1/08; H02M 1/088; H02M 3/158; H02M 3/1584; H02M 2001/0048; H02M 2003/1586; H02M 3/1588
See application file for complete search history.

(56) References Cited

U.S. PATENT DOCUMENTS

2016/0072397 A1\* 3/2016 Deboy .............. H02M 3/33592
363/21.1

\* cited by examiner

*Primary Examiner* — Jue Zhang
*Assistant Examiner* — Lorena D Bruner

(57) ABSTRACT

Disclosed are multilevel buck converters, and controllers and methods for operating such converters. Embodiments improve the voltage gain ($V_o/V_{in}$) of multi-level DC-DC converters, such as three-level converters, that is imposed by a duty cycle limitation in conventional approaches. According to certain embodiments, the duty cycle of switches is controlled to so that the converter output voltage is increased.

13 Claims, 22 Drawing Sheets

TWO-PHASE THREE-LEVEL CONVERTER AND CONTROLLER THEREFOR

RELATED APPLICATIONS

This application claims the benefit of the filing date of U.S. Application No. 62/321,027, filed on Apr. 11, 2016, and of U.S. Application No. 62/473,464, filed on Mar. 19, 2017, the contents of which are incorporated herein by reference in their entirety.

FIELD

The invention relates to DC-DC converters. More particularly, the invention relates to multilevel buck converters, and to controllers and methods for operating such converters.

BACKGROUND

Non-isolated DC-DC converters are widely used in modern electronic equipment. These converters are directly built right next to the load, and are also referred to as point-of-load (POL) power supplies. With increasing demand to miniaturize voltage regulators for computers and telecommunication products, high power density POL converter topologies are highly desirable. The inductor in a conventional buck converter occupies a large portion of the buck converter's space. It is difficult to reduce the size and weight of the inductor. For example, in current POL power modules, inductors occupy most of the substrate space such that they are the most significant barrier to increasing power density.

Increasing the switching frequency is a common and simple way to reduce the inductance required for a POL buck converter. A drawback of this approach is that the power loss will be increased and the switches will overheat. Also, increasing the switching frequency beyond tens of MHz in a non-integrated POL buck converter is impractical since a very small duty cycle is needed to provide very low output voltage (usually 0.5-1.6V) for modern microprocessors. A very small duty cycle limits the maximum switching frequency. The single phase three-level buck converter shown in FIG. 1A is a potential candidate for replacing the conventional buck converter in high power density POL converters because the operating frequency can be doubled. More capacitors need to be added to such a single phase three-level buck converter to further increase the operating frequency (e.g., a four-level buck converter), but the extra capacitors complicate the operation of the converter.

When high output current is needed, multi-phase converters may be used to improve the efficiency of the entire system. For a conventional multi-phase buck converter such as two-phase buck converter shown in FIG. 1B, the output current is not evenly shared by each phase because of component tolerance and various parasitic components on the printed circuit board (PCB) tracks. Uneven output current sharing will cause uneven thermal dissipation and will decrease efficiency of the converter. Thus, auxiliary circuits and components are needed to share the output current evenly, which increases the cost of the converters and also complicates their control.

In a POL application, most loads require very low output voltage ranging from 0.5V to 3.3V. At the same time, higher output voltages are also required, such as by USB ports (5V), and for dynamic voltage scaling. However, the voltage gain of the converters is small because of the duty cycle limitation. Accordingly, the maximum output voltage of the converters is limited. This problem exists in most three-level DC-DC converters.

SUMMARY

According to one aspect of the invention there is provided a two-phase asymmetrical three-level buck converter, comprising: a first input terminal connected to a first common terminal of a first switch connected in parallel with a third switch; a first node connected to a second common terminal of the first and third switches, and to a first common terminal of a second switch connected in parallel with a fourth switch; a second common terminal of the second and fourth switches connected to a second node and a first terminal of a fifth switch; a first capacitor having a first terminal connected to the first node and a second terminal connected to a third node and a first terminal of a sixth switch; a first inductor having a first terminal connected to the second node and a second terminal connected to a main output terminal; a second inductor having a first terminal connected to the third node and a second terminal connected to the main output terminal; a common node connected to a second input terminal, a second terminal of the sixth switch, a second terminal of the fifth switch, and a second output terminal; and a second capacitor connected between the main output terminal and the second output terminal.

In one embodiment, the two-phase asymmetrical three-level buck converter may comprise a DC power supply connected across the first input terminal and the second input terminal.

In one embodiment, the two-phase asymmetrical three-level buck converter may comprise a controller that provides a driving signal for each of the first to sixth switches.

In one embodiment, the controller drives the first to sixth switches so that: the first, second, third, and fourth switches are driven with 90° phase difference from each other; the fifth switch is driven complementarily to the second and fourth switches; and the sixth switch is driven complementarily to the first and third switches.

In one embodiment, the controller drives the first to sixth switches so that: the first, second, third, and fourth switches are turned on and off once, sequentially, during one switching cycle, wherein a duty cycle of each of the first to fourth switches is prolonged such that successive on times of the first, second, third, and fourth switches overlap by a selected interval; and the fifth switch and the sixth switch are each turned on and off twice during a switching cycle; wherein the fifth and sixth switches are off during the overlaps of the on times of the first to fourth switches.

According to another aspect of the invention there is provided a controller for a two-phase asymmetrical three-level buck converter, comprising: an input that receives a signal corresponding to the converter output voltage or current; a circuit that generates a duty cycle signal based on the sensed output voltage or current; a driving circuit that generates gate drive signals for switches of the converter; wherein the converter is a two-phase asymmetrical three-level buck converter; wherein the controller drives the first to sixth switches so that: the first, second, third, and fourth switches are turned on and off once, sequentially, during one switching cycle, wherein a duty cycle of each of the first to fourth switches is prolonged such that successive on times of the first, second, third, and fourth switches overlap by a selected interval; and the fifth switch and the sixth switch are each turned on and off twice during a switching cycle;

wherein the fifth and sixth switches are off during the overlaps of the on times of the first to fourth switches.

In one embodiment, increasing the selected interval of the overlap of the successive on times of the first to fourth switches increases the output voltage of the two-phase asymmetrical three-level buck converter.

According to another aspect of the invention there is provided a controller for a series capacitor buck converter comprising first and second control switches and first and second synchronous rectifier (SR) switches, the controller comprising: an input that receives a signal corresponding to the converter output voltage or current; a circuit that generates a duty cycle signal based on the sensed output voltage or current; a driving circuit that generates gate drive signals for switches of the converter; wherein the controller drives the switches so that: the first and second control switches are turned on and off once, sequentially, during one switching cycle, wherein a duty cycle of each of the first and second control switches is greater than 50% such that the on times of the first and second control switches overlap by a selected interval; and the first and second SR switches are each turned on and off once, sequentially, during a switching cycle, wherein each of the on times of the first and second SR switches coincides with an off time of one of the first and second control switches; wherein the first and second SR switches are off during the overlaps of the on times of the first and second control switches.

In one embodiment, increasing the duty cycle above 50% increases the output voltage of the series capacitor buck converter.

According to another aspect of the invention there is provided a method for controlling a two-phase asymmetrical three-level buck converter, comprising controlling the first to sixth switches so that: the first, second, third, and fourth switches are turned on and off once, sequentially, during one switching cycle, wherein a duty cycle of each of the first to fourth switches is prolonged such that successive on times of the first, second, third, and fourth switches overlap by a selected interval; and the fifth switch and the sixth switch are each turned on and off twice during a switching cycle; wherein the fifth and sixth switches are off during the overlaps of the on times of the first to fourth switches.

In one embodiment, increasing the selected interval of the overlap of the successive on times of the first to fourth switches increases an output voltage of the two-phase asymmetrical three-level buck converter.

According to another aspect of the invention there is provided a method for controlling a series capacitor buck converter comprising first and second control switches and first and second synchronous rectifier (SR) switches, comprising controlling the switches so that: the first and second control switches are turned on and off once, sequentially, during one switching cycle, wherein a duty cycle of each of the first and second control switches is greater than 50% such that the on times of the first and second control switches overlap by a selected interval; and the first and second SR switches are each turned on and off once, sequentially, during a switching cycle, wherein each of the on times of the first and second SR switches coincides with an off time of one of the first and second control switches; wherein the first and second SR switches are off during the overlaps of the on times of the first and second control switches.

In one embodiment, increasing the duty cycle above 50% increases an output voltage of the series capacitor buck converter.

According to another aspect of the invention there is provided a series capacitor buck converter comprising a controller as described herein.

BRIEF DESCRIPTION OF THE DRAWINGS

For a better understanding of the invention, and to show more clearly how it may be carried into effect, embodiments will be described, by way of example, with reference to the accompanying drawings, wherein.

DETAILED DESCRIPTION OF EMBODIMENTS

Figure 1A:
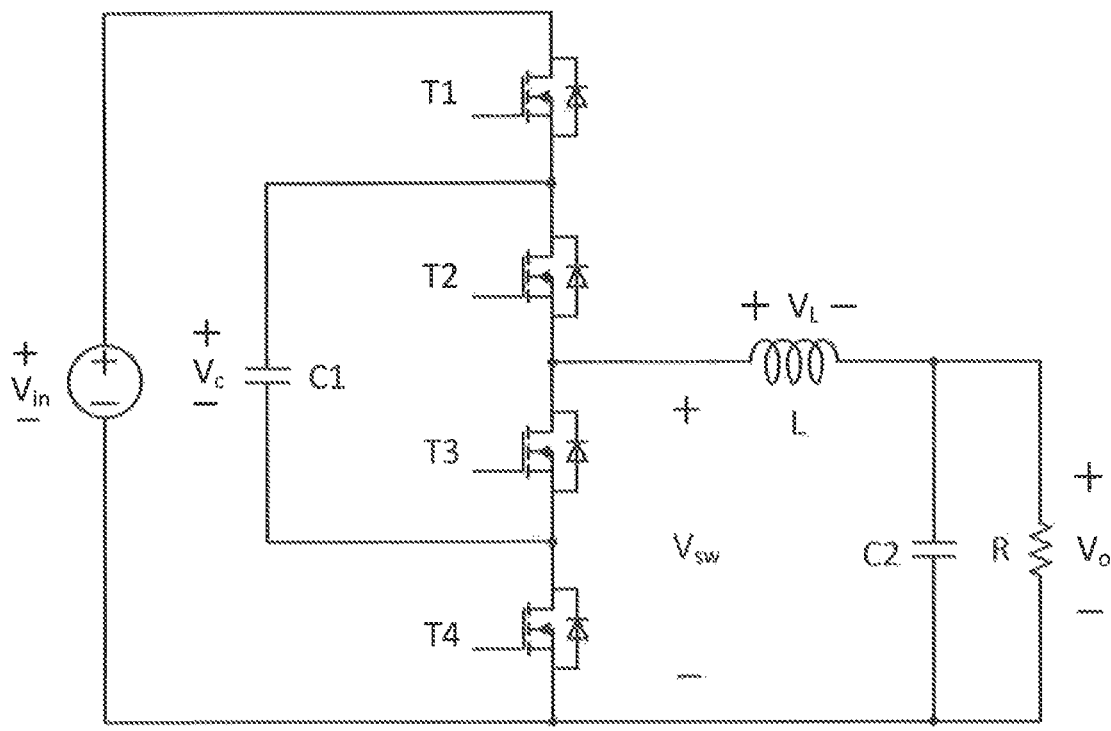
FIG. 1A is a circuit diagram of a single phase three-level buck converter according to the prior art.

Throughout the drawings and the description, identical components have been given the same reference numerals.

Throughout the description and claims, the terms "first", "second", etc. are used to differentiate features or elements and not to indicate any particular relationship or sequence among them.

For the purpose of this description, the term "RMS current" as used herein is intended to refer to root mean square current, $V_{in}$ refers to DC power supply voltage, $V_{C1}$ refers to the first capacitor voltage, $V_{L1}$ refers to the voltage across the first inductor, $V_{L2}$ refers to the voltage across the second inductor, $V_o$ refers to the output voltage, and R refers to load.

For the purpose of this description, the term "switch" is intended to refer to a semiconductor switch characterized by controllable conduction. The term "MOSFET" is used as a non-limiting example of all such semiconductor switches. An N-channel MOSFET is an example of such a switch, wherein the first terminal is the drain, the second terminal is the source, and the control terminal is the gate. The control terminal of each semiconductor switch may be provided with its own control signal. It will be understood that other suitable devices, such as, for example, IGBT may be used for the semiconductor switches in the embodiments of the invention. In accordance with embodiments described herein, current in each switch may flow in both directions. This may be ensured or enabled by, for example, each switch being reversely connected in parallel with a diode. In accordance with embodiments described herein, such a switch may be, for example, an IGBT with a parallel diode, or a MOSFET where the parallel diode is inherent (i.e., the body diode).

Figure 2:
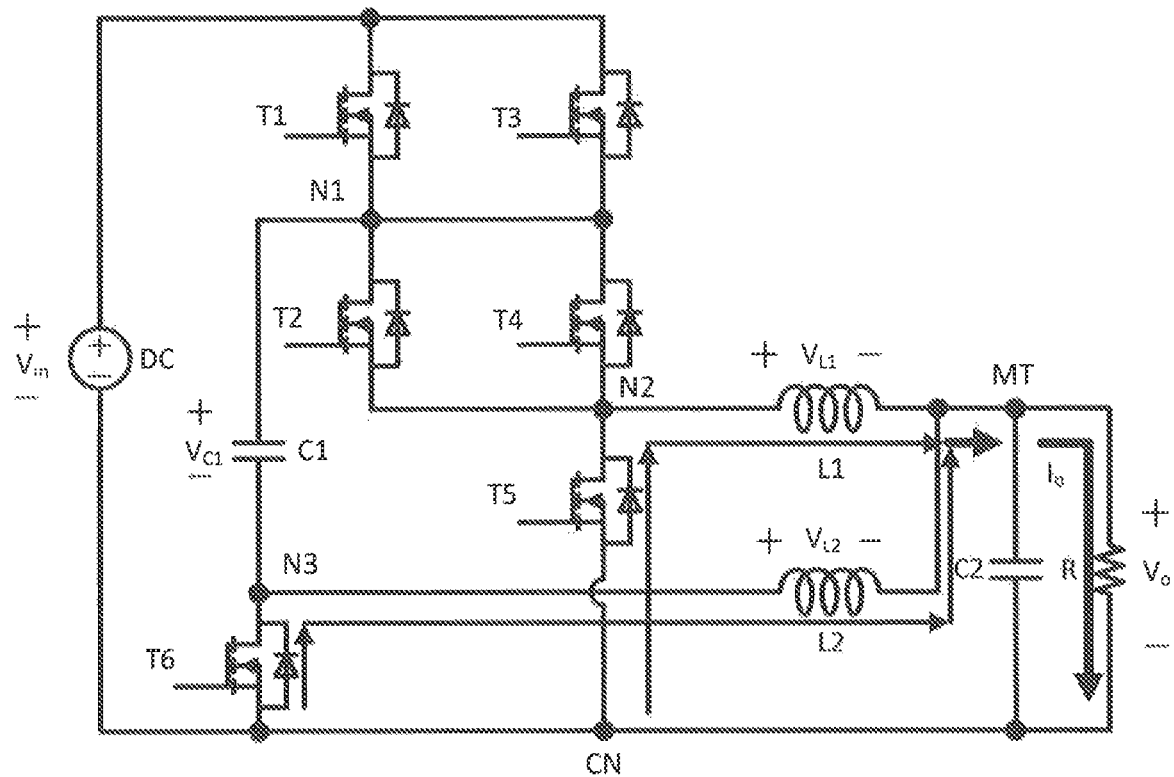
FIG. 2 is a circuit diagram of a two-phase asymmetrical three-level buck converter according to an embodiment of the invention.

One aspect of the invention relates to a two-phase asymmetrical three-level buck converter and control methods therefor. FIG. 2 shows a circuit diagram of a two-phase asymmetrical three-level buck converter according to one embodiment. Referring to FIG. 2, the circuit has two input terminals, two output terminals, six switches (T1, T2, T3, T4, T5 and T6), a first capacitor C1, a first inductor L1, a second inductor L2 and a second capacitor C2, and four nodes CN, N1, N2, N3, wherein CN is the common node (which may also be referred to as ground). One input terminal and one output terminal are connected together at the common node. The other output terminal is also referred to as the main output terminal MT. The load is shown as a resistor R connected across the main output terminal and the common node.

As shown in FIG. 2, the first switch T1 is connected in parallel with the third switch T3, and the second switch T2 is connected in parallel with the fourth switch T4. The common first terminal of the first and the third switches is connected to the first input terminal, and the common second terminal of the first and the third switches is the first node N1, which is connected to the common first terminal of the second and the fourth switches. The common second terminal of the second and the fourth switches is the second node N2, which is connected to the first terminal of the fifth switch T5 and the first terminal of the first inductor L1. The positive terminal of the first capacitor C1 is connected to the first node N1, and the negative terminal is connected to the third node N3 and the first terminal of the sixth switch T6. The positive side of a DC power supply is connected to the first input terminal, and the negative side of the DC power supply is connected to the second input terminal. The first inductor L1 is connected between the second node N2 and the main output terminal MT. The second inductor L2 is connected between the third node N3 and the main output terminal MT. The second capacitor C2 is connected across the main output terminal MT and the common node CN. The second input terminal, the second terminals of the sixth switch T6 and the fifth switch T5, and the second terminal of the second capacitor C2, are all connected together with the second output terminal, which all together are referred to as the common node CN.

Each of inductors L1 and L2, together with the second capacitor C2, forms an LC filter.

In some embodiments, the two LC filters may be omitted. When the two LC filters are omitted, the output will be two pulse voltages.

In some embodiments, the second capacitor C2 may be omitted. When the second capacitor C2 is omitted, the output will be constant current.

In this description, the term "switch group A" refers to the first switch T1 and the second switch T2, and the term "switch group B" refers to the third switch T3 and the fourth switch T4.

Figure 6:
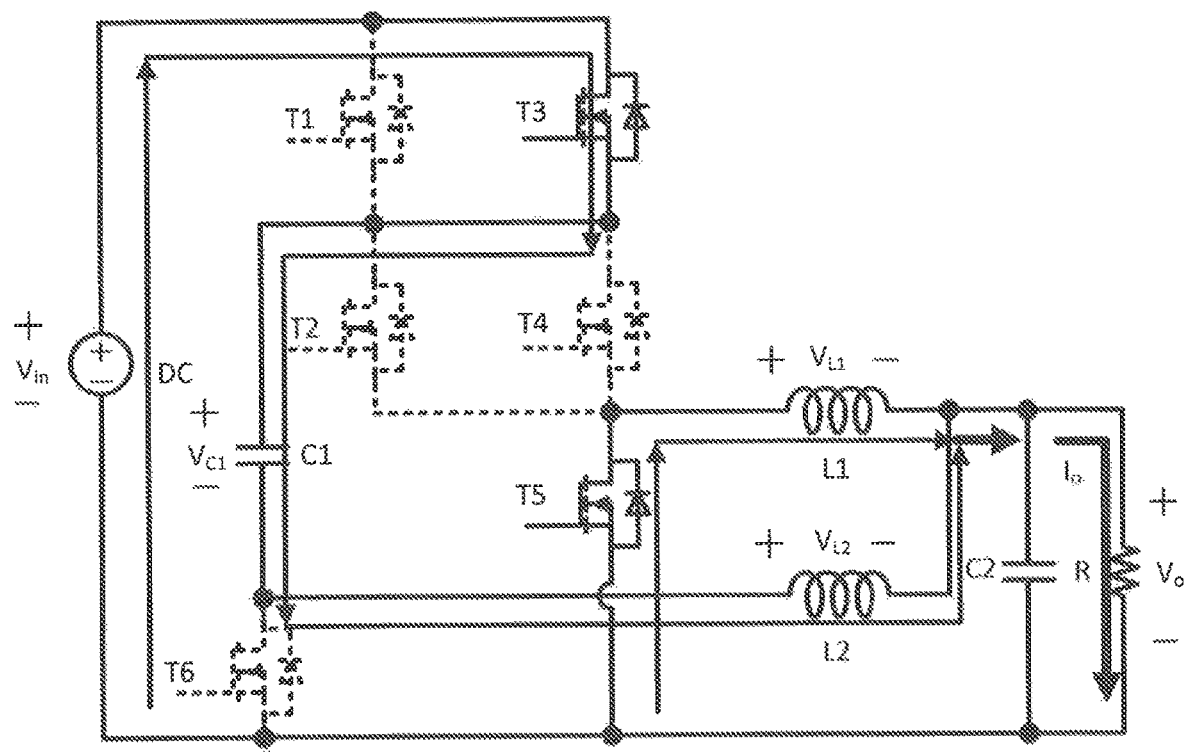
Figure 7:
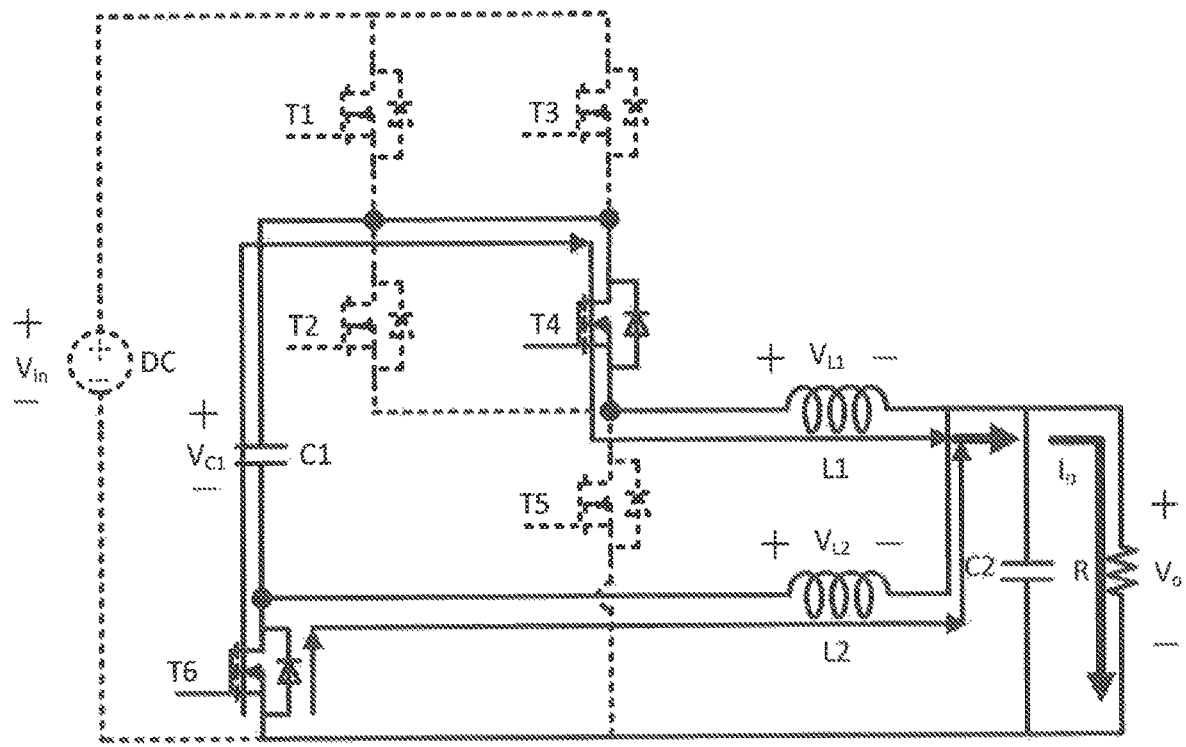
Figure 8:
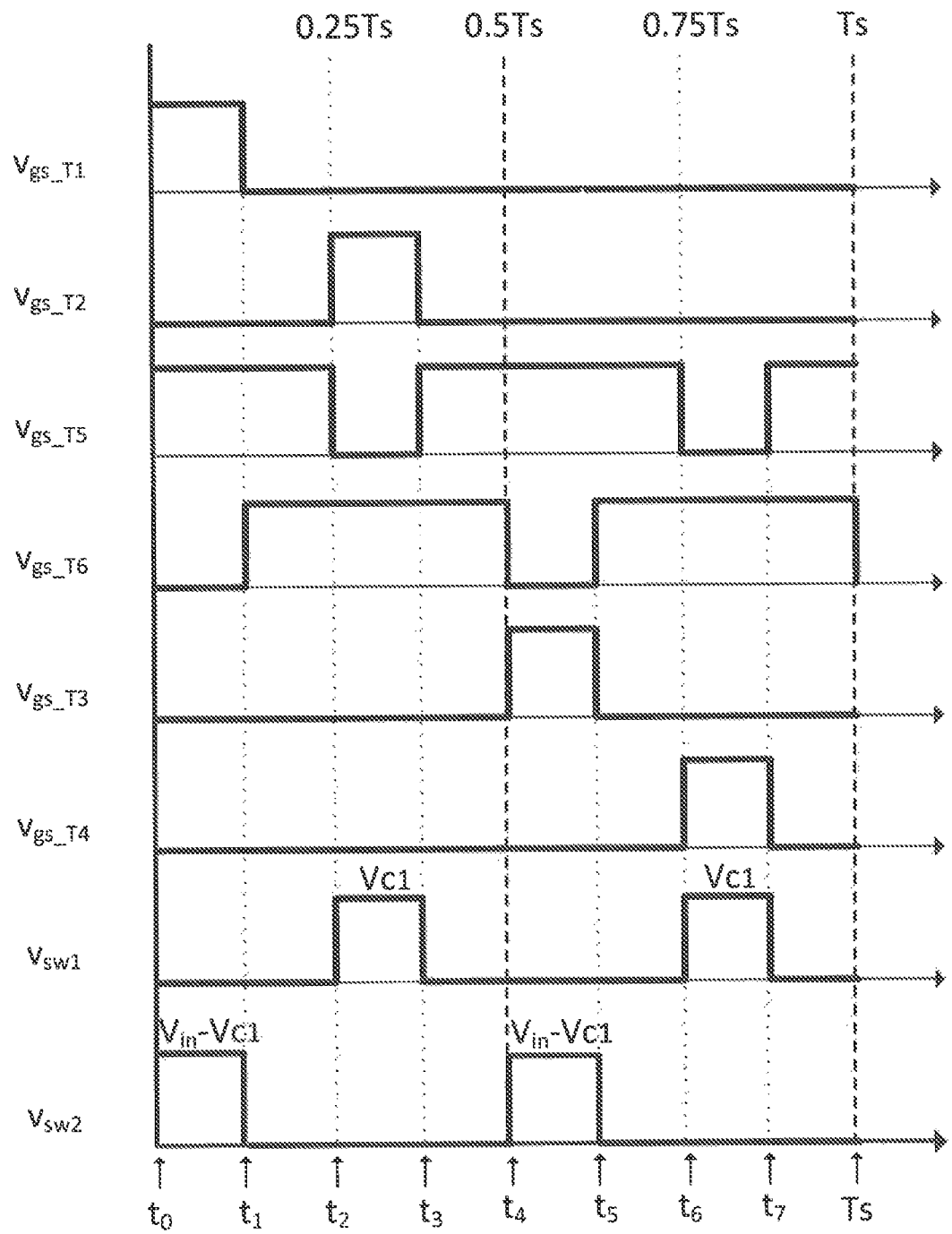
FIG. 8 is a timing diagram for the operating modes shown in FIGS. 3-7, for the two-phase asymmetrical three-level buck converter of FIG. 2, according to an embodiment of the invention.

Another aspect of the invention relates to a method or operating the embodiment of FIG. 2. An example of a control method is shown in FIGS. 3-7, in which the operation of the circuit is presented as five working modes. The timing diagram is shown in FIG. 8. This operating method is referred to herein as the "normal" operating method, or "normal" operation. Another operating method of the embodiment of FIG. 2 is described in Example 1, below.

Normal operation is described below with the following exemplary values: total voltage of DC power supply $V_{in}$ is equal to 12 volts, the voltage $V_{C1}$ is half of $V_{in}$ (6 volts), the output voltage equals 2.5 volts and the switching frequency for each of the switches T1, T2, T3, and T4 is 300 KHz. In FIGS. 3-7, portions of the circuit shown with solid lines are working during that mode, and portions shown with dotted lines are off during that mode.

The voltage $V_{C1}$ equals half of V in this embodiment, which is a non-limiting example. That is, $V_{C1}$ and $V_{in}$ are not limited to a particular relationship. Rather, the voltage $V_{C1}$ may be chosen to be any value between zero and $V_{in}$.

The potential on the common node CN is defined as ground potential. The current or voltage between the second node and the main output terminal forms a first phase output, and that between the third node and the main output terminal forms a second phase output. The term "$V_{sw1}$" refers to the voltage supplied to the first inductor (between the second node N2 and the common node CN), and "$V_{sw2}$" refers to the voltage supplied to the second inductor (between the third node N3 and the common node CN).

Figure 3:
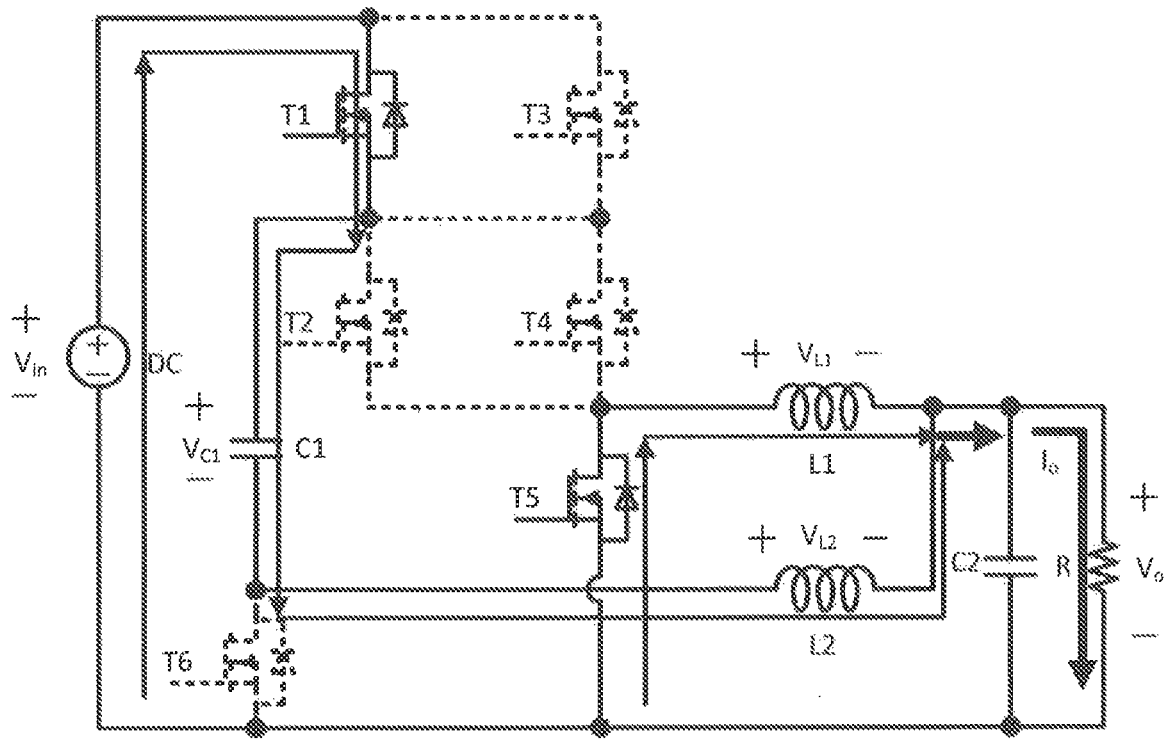
FIGS. 3-7 are circuit diagrams showing the first to fifth operating modes, respectively, of the two-phase asymmetrical three-level buck converter of FIG. 2, according to an embodiment of the invention.

For the first working mode shown in FIG. 3, the current in L2 flows as follows: DC→T1→C1→L2→R→DC. The first capacitor C1 is charged by the DC power supply. The voltage $V_{sw2}$ equals the DC power supply voltage $V_{in}$ minus the first capacitor voltage $V_{C1}$. That is, $V_{sw2}=V_{in}-V_{C1}=0.5V_{in}$. At the same time, there is a freewheeling loop for the first inductor L1. It is T5→L1→R→T5. The voltage $V_{sw1}$ equals zero. That is, $V_{sw1}=0$.

Figure 4:
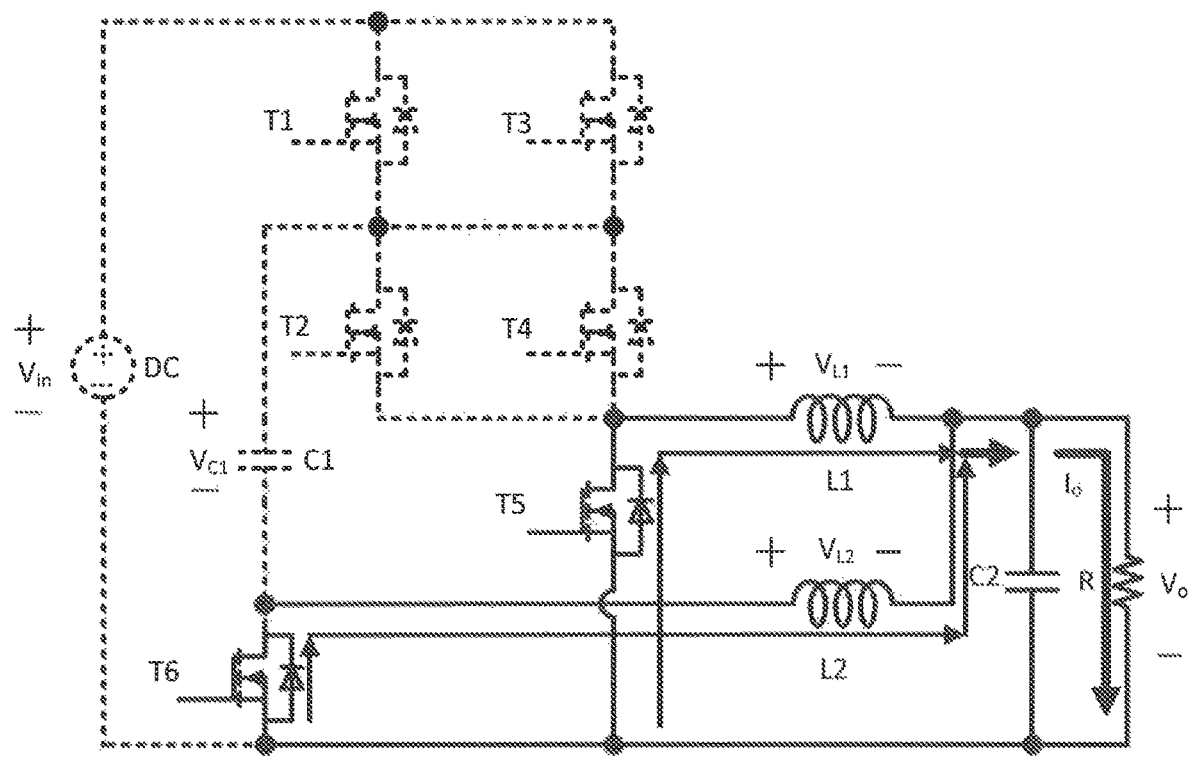

For the second working mode shown in FIG. 4, the inductor L1 works in freewheeling mode through the following loop: T5→L1→R→T5. The voltage $V_{sw1}$ equals zero. That is, $V_{sw1}=0$. The inductor L2 also works in freewheeling mode through the following loop: T6→L2→R→T6. The voltage $V_{sw2}$ equals zero. That is, $V_{sw2}=0$.

Figure 5:
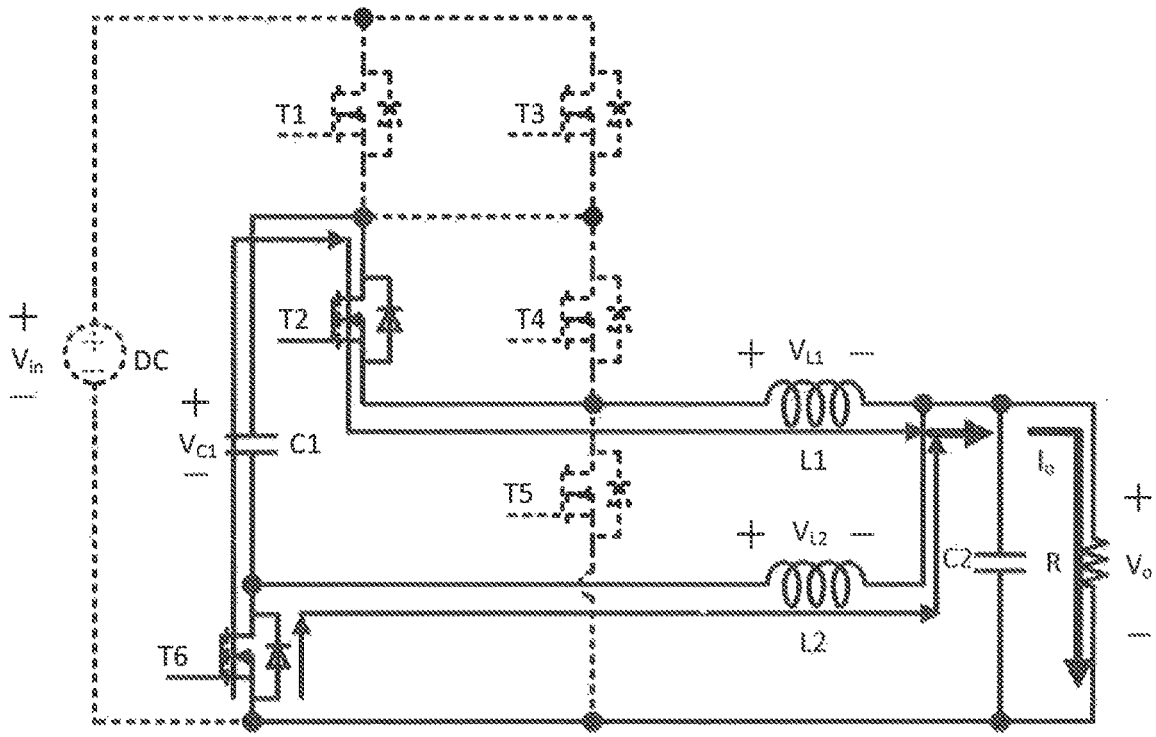

For the third working mode shown in FIG. 5, the current in L1 flows as follows: C1→T2→L1→R→T6→C1. The first capacitor C1 is discharged. The voltage $V_{sw1}$ equals the first capacitor voltage $V_{C1}$. That is, $V_{sw1}=V_{C1}=0.5V_{in}$. The inductor L2 works in freewheeling mode through the following loop: T6→L2→R→T6. The voltage $V_{sw2}$ equals zero. That is, $V_{sw2}=0$.

For the fourth working mode shown in FIG. 6, the inductor L1 works in freewheeling mode through the loop as follows: T5→L1→R→T5. The voltage $V_{sw1}$ equals zero. That is, $V_{sw1}=0$. The current in L2 flows as follows: DC→T3→C1→L2→R→DC. The first capacitor C1 is charged by the DC power supply. The voltage $V_{sw2}$ equals the DC power supply voltage $V_{in}$ minus the first capacitor voltage $V_{C1}$. That is, $V_{sw2}=V_{in}-V_{C1}=0.5V_{in}$.

For the fifth working mode shown in FIG. 7, the current in L1 flows as follows: C1→T4→L1→R→T6→C1. The first capacitor C1 is discharged. The voltage $V_{sw1}$ equals the first capacitor voltage $V_{C1}$. That is, $V_{sw1}=V_{C1}=0.5V_{in}$. The inductor L2 works in freewheeling mode through the following loop: T6→L2→R→T6. The voltage $V_{sw2}$ equals zero. That is, $V_{sw2}=0$.

According to this embodiment, the two-phase asymmetrical three-level buck converter works alternately among the five above-mentioned working modes by controlling the on and off states of each switch to output the selected voltage.

FIG. 8 shows the timing diagram for the switches in this embodiment during one switching period Ts. The four switches T1, T2, T3, and T4 are driven with 90° phase difference from each other. The switch T5 is driven complementarily to the switches T2 and T4, and the switch T6 is driven complementarily to the switches T1 and T3.

As shown in FIG. 8, switches in switch group A and switch group B are interleaved. During the first half period (from 0 to 0.5Ts), the switches T1 and T2 in switch group A are on in turn and the switches T3 and T4 in switch group B are off. During the second half period (from 0.5Ts to Ts), the switches T3 and T4 in switch group B are on in turn and the switches T1 and T2 in switch group A are off.

It is noted that in one period Ts, the switches in either switch group A or switch group B turn on only once but the operating frequency of the voltage $V_{sw1}$ and $V_{sw2}$ is twice. This means that each inductor L1, L2 operates at, e.g., 2 MHz when the four switches T1, T2, T3, and T4 operate at 1 MHz. To achieve the same operating frequency, the conventional single phase three-level buck converter in FIG. 1A and the conventional two-phase buck converter in FIG. 1B must have double the switching frequency and each switch must turn on twice. Thus, the root mean square current in each of the four switches is reduced by half compared to the conventional three-level buck and two-phase buck converters. Accordingly, the conduction power loss in each switch is reduced.

Since the input voltage to the inductor of each phase is reduced and the operating frequency is twice the switching frequency, the inductance of a two-phase asymmetrical three-level buck converter as described herein is much smaller than that of the conventional two-phase buck converter.

In this description, the term $D_{ATL}$ is intended to refer to the duty cycle. It is defined as the percentage of on time of a switch in one switching period $T_s$. That is, $T_{on}/T_s$, where $T_{on}$ refers to the conduction time. The voltage conversion ratio is defined as $V_o/V_{in}$. Using of the principle of inductor volt-second balance in Equation (1), the output voltage $V_o$ may be derived.

$$\langle v_L \rangle = \frac{1}{T_s}\int_0^{T_s} v_L(t)dt = 0 \tag{1}$$

Apply Equation (1) to the inductors L1 and L2 to get Equation (2).

$$\begin{cases} \langle v_{L1} \rangle = \frac{1}{T_s}\int_0^{T_s} v_{L1}(t)dt = 0 \\ \langle v_{L2} \rangle = \frac{1}{T_s}\int_0^{T_s} v_{L2}(t)dt = 0 \end{cases} \tag{2}$$

Applying small-ripple approximation to Equation (2), Equation (3) is derived.

$$\begin{cases} \langle v_{L1} \rangle = 2 \cdot D_{ATL}(V_c - V_o) + (1 - 2 \cdot D_{ATL})(-V_o) = 0 \\ \langle v_{L2} \rangle = 2 \cdot D_{ATL}(V_{in} - V_c - V_o) + (1 - 2 \cdot D_{ATL})(-V_o) = 0 \end{cases} \tag{3}$$

Simplify Equation (3) and solve the equation, leads to Equation (4), where the ratio of $V_o$ to $V_{in}$ is the voltage conversion ratio.

$$V_o = V_{in} \cdot D_{ATL} \tag{4}$$

As shown in FIG. 8, the switches T1 and T2 or T3 and T4 do not overlap during normal operation. So the maximum duty cycle is 0.25. For 12V input, the maximum output voltage is 3V.

As the output current of the two-phase asymmetrical three-level buck converter is derived by summing two phases of inductor current, the output current ripple in each phase is at least partially cancelled out, such that the inductor current ripple is reduced. Accordingly, the LC filter requirement is reduced.

Figure 1B:
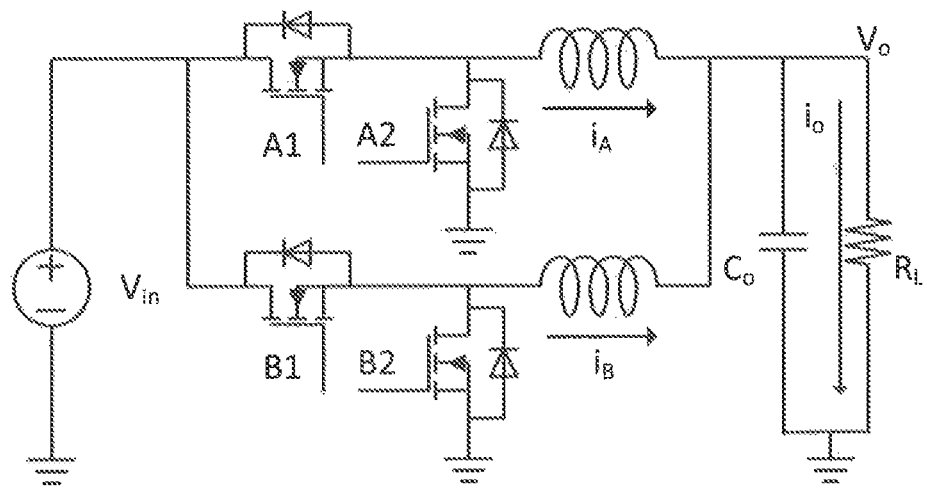
FIG. 1B is a circuit diagram of a two-phase buck converter according to the prior art.

The normalized output current ripple of the conventional two-phase buck converter in FIG. 1B may be expressed as Equation (5), where K is the ripple cancellation coefficient, D is duty cycle and it is defined as the magnitude ratio of the output current ripple $\Delta i_o$ to inductor current ripple $\Delta i_L$; m=floor(2·D).

$$K = \frac{\Delta i_o}{\Delta i_L} = \frac{2 \cdot \left(D - \frac{m}{2}\right) \cdot \left(\frac{m+1}{2} - D\right)}{D \cdot (1 - D)} \tag{5}$$

For the two-phase asymmetrical three-level buck converter, the operating frequency of each inductor is twice the switching frequency. Thus, the duty cycle of the inductor current is twice that of the switches. Equation (6) gives the normalized output current ripple, where m=floor(4·$D_{ATL}$).

$$K_{ATL} = \frac{\Delta i_o}{\Delta i_L} = \frac{2 \cdot \left(2D_{ATL} - \frac{m}{2}\right) \cdot \left(\frac{m+1}{2} - 2D_{ATL}\right)}{D_{ATL} \cdot (1 - D_{ATL})} \tag{6}$$

Figure 9:
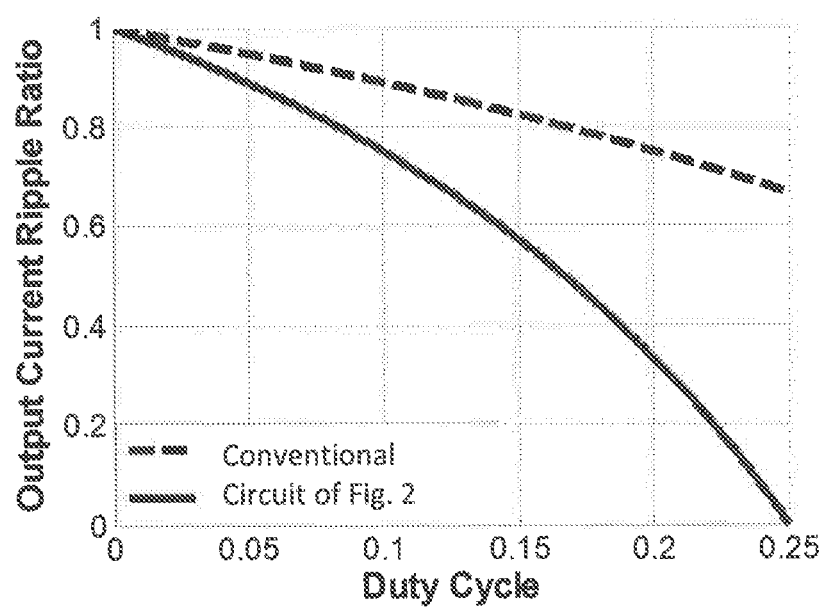
FIG. 9 is a plot showing normalized output current ripple coefficient against duty cycle for a conventional two-phase buck converter and the buck converter of FIG. 2 when the duty cycle is below 0.25, according to an embodiment of the invention.

It can be seen from Equation (5) and Equation (6) that the amount of current ripple cancellation only depends on the duty cycle. FIG. 9 shows the normalized output current ripple coefficient against duty cycle for the conventional two-phase buck converter and a converter as described herein when the duty cycle is below 0.25 (i.e., output voltage is below 3V). It is noted that POL converters usually have very low duty cycle due to the low output voltage requirement.

FIG. 9 shows that a converter as described herein has lower output current ripple coefficient than the conventional two-phase buck converter. Therefore, the second capacitor C2 may be implemented with smaller capacitance.

It can be seen from the above five working modes that there are three operating states of the first capacitor C1 in one switching period. They are discharging, charging, and floating. During the steady-state, the first capacitor voltage $V_{C1}$ is fixed. Thus, the first capacitor charge balance equation and small-ripple approximation may be derived by Equation (7), where $I_{L1}$ and $I_{L2}$ are DC values of $i_{L1}$ and $i_{L2}$; $D_{charge}$ and $D_{discharge}$ represent respectively the duty cycles of the first capacitor charging and discharging.

$$\langle i_c \rangle = D_{charge} \cdot T_s \cdot I_{L1} - D_{discharge} \cdot T_s \cdot I_{L2} = 0 \quad (7)$$

Equation (7) is simplified to (8) according to the first capacitor charge balance, $D_{charge} = D_{discharge}$.

$$D_{charge} \cdot I_{L1} = D_{discharge} \cdot I_{L2} \quad (8)$$

It can be seen that $I_{t1}$ is always equal to $I_{t2}$. Thus, a two-phase asymmetrical three-level buck converter as described herein has an inherent automatic inductor current sharing mechanism. No extra current sensing circuits and controllers are needed.

When the output current is reduced below the critical current level (e.g., Io=2 A), the two-phase asymmetrical three-level buck converter is operating in discontinuous conduction mode. It is observed that $I_{L2}$ only flows in one direction, but $I_{L2}$ is able to flow in both directions. The reason is that after $i_{L2}$ falls to zero, it can continue to flow in the reverse direction and flow to the negative terminal of the first capacitor. But $I_{L2}$ is not able to continue to flow in the reversed direction. Therefore, the DC current and current ripple of each inductor are not equal.

The automatic current sharing mechanism weakens in discontinuous conduction mode and may become worse when taking into consideration component parameter variance. In order to improve the performance of the automatic inductor current sharing mechanism in discontinuous conduction mode, a control method according to another embodiment, referred to as the negative circulating control method is described.

According to the negative circulating control method, the two switches T5 and T6 are kept on when the currents in both inductors are going through zero, to keep them decreasing to negative during the rest of the freewheeling time. The switch T5 is driven complementarily to the switches T2 and T4, and the switch T6 is driven complementarily to the switches T1 and T3, as shown in FIG. 8. The inductor currents of the two phases are of the same DC value, so even inductor-current sharing is achieved. In this way, not only the performance of automatic inductor-current sharing function remains as it does in continuous conduction mode, but also no additional modification of the circuit or controller is needed.

Another aspect of the invention relates to a controller that operates a two-phase asymmetrical three-level buck converter according to the methods described herein. The controller may be implemented in any combination of discrete and integrated components, digitally or analogue, or in a platform such as a field programmable gate array (FPGA), as known in the art.

Input Voltage Boost Control

Figure 19:
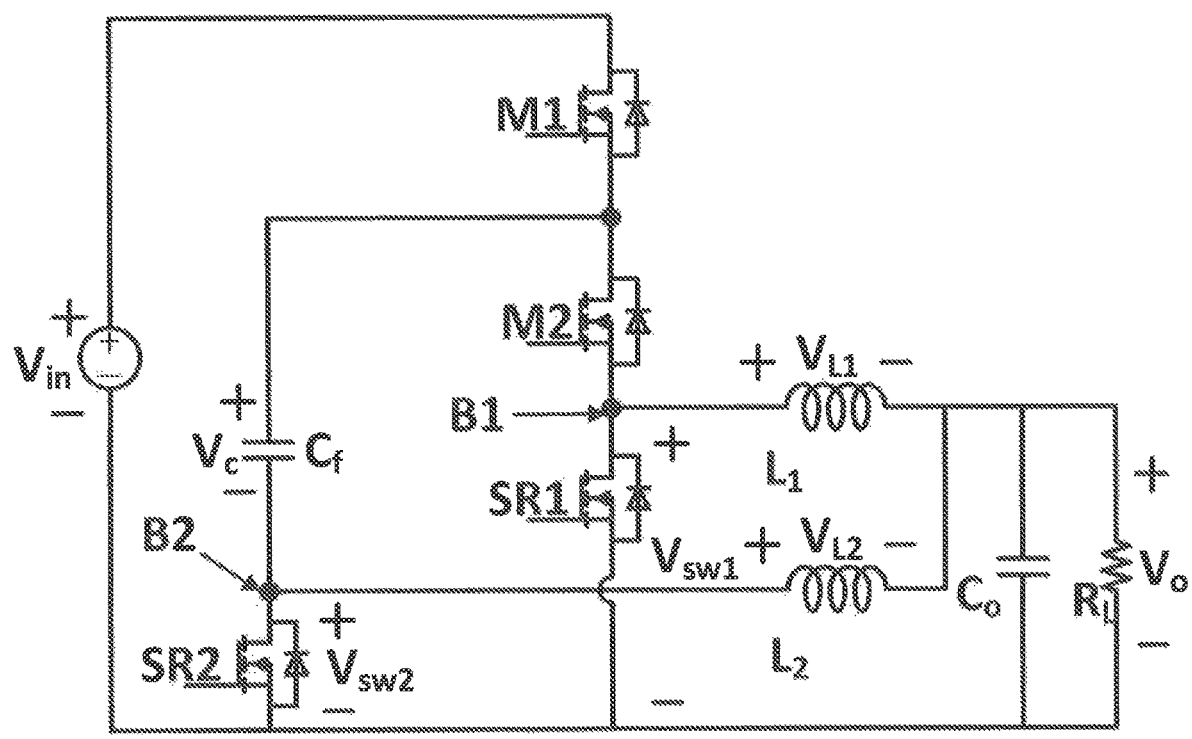
FIG. 19 is a circuit diagram of a series capacitor buck converter according to the prior art.

The voltage gain ($V_o/V_{in}$) of three-level DC-DC converters, such as the example described above, is small because of the duty cycle limitation. Accordingly, the maximum output voltage of such a converter is limited. To address this issue, a control method referred to herein as "input voltage boost control" (IVBC) will now be described. As shown below, IVBC may be applied to three-level DC-DC converters to increase the output voltage level. Two embodiments of the IVBC operating method are described. In the first embodiment, described in Example 1, the IVBC method is implemented in a two-phase asymmetrical three-level buck converter as shown in FIG. 2. In the second embodiment, described in Example 2, the IVBC method is implemented in a two-phase three-level buck converter (also referred to as a series capacitor buck converter) as shown in FIG. 19.

Example 1

Figure 10:
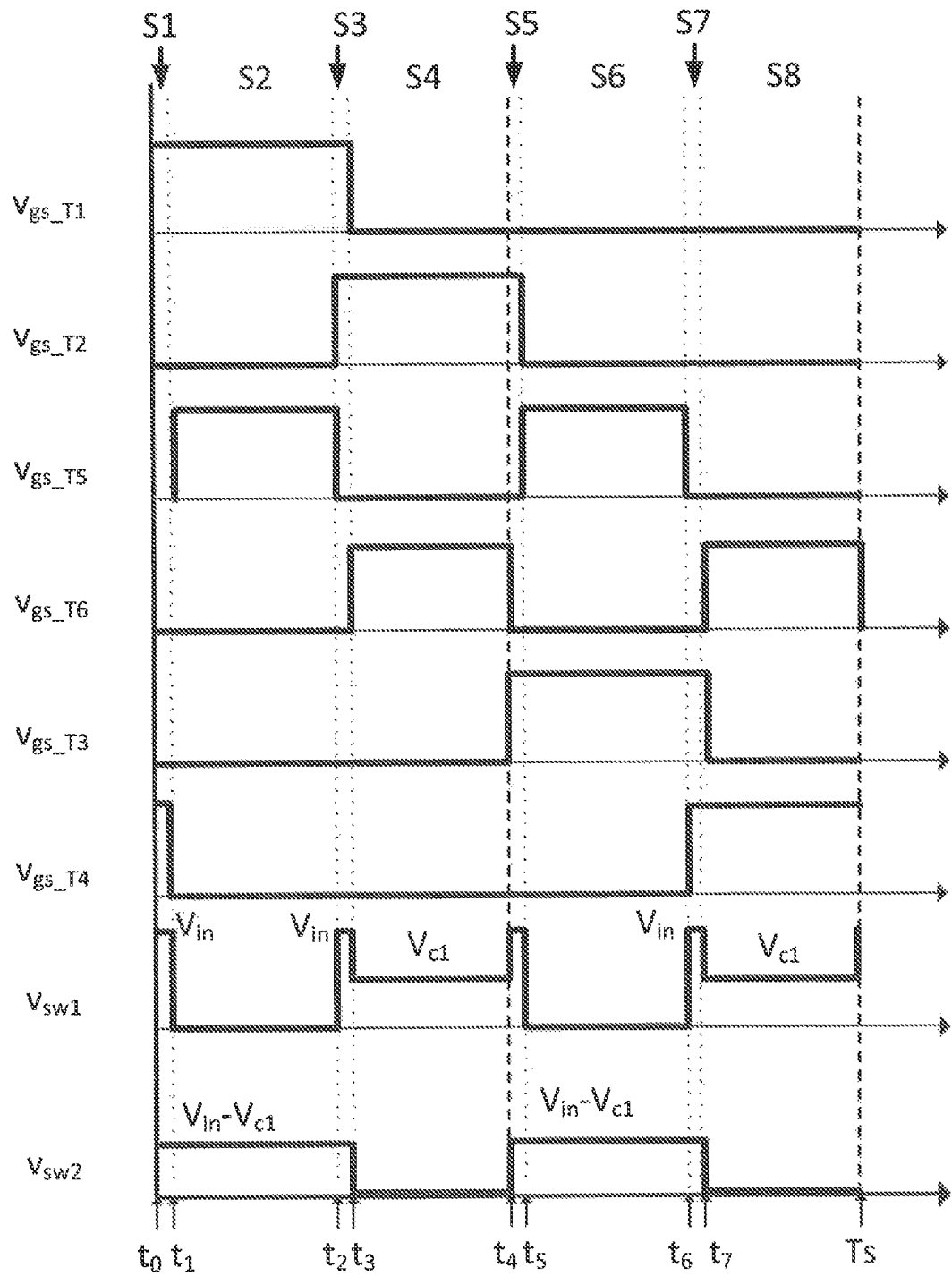
FIG. 10 is a timing diagram for the two-phase asymmetrical three-level buck converter of FIG. 2 operating under an input voltage boost control method, according to an embodiment of the invention.

FIG. 10 shows the timing operation waveforms for each switch of a two-phase asymmetrical three-level buck converter, shown in FIG. 2, under the IVBC method. The driving signal for each of the four switches T1, T2, T3, and T4 has 90° phase difference from each other in the normal operation mode described above. However, under the IVBC method, each driving signal of the four switches T1, T2, T3, and T4 is prolonged to generate overlaps of the edges of the timing signals, for example, T1 overlaps with T2 and T4, T2 overlaps with T1 and T3, T3 overlaps with T2 and T4, and T4 overlaps with T3 and T1, as shown in FIG. 10. The overlap regions are marked as S1, S3, S5, and S7 in FIG. 10. The working states in these regions are referred to as boost states since the current of inductor L1 is boosted during that time. In boost states, two series-connected switches are on at the same time. The input voltage $V_{sw1}$ to the inductor $L_1$ is $V_{in}$ Instead of $V_{C1}$ for a short time. That is, the input voltage $V_{sw1}$ to the inductor L1 is increased so that the output voltage level is increased.

Figure 11:
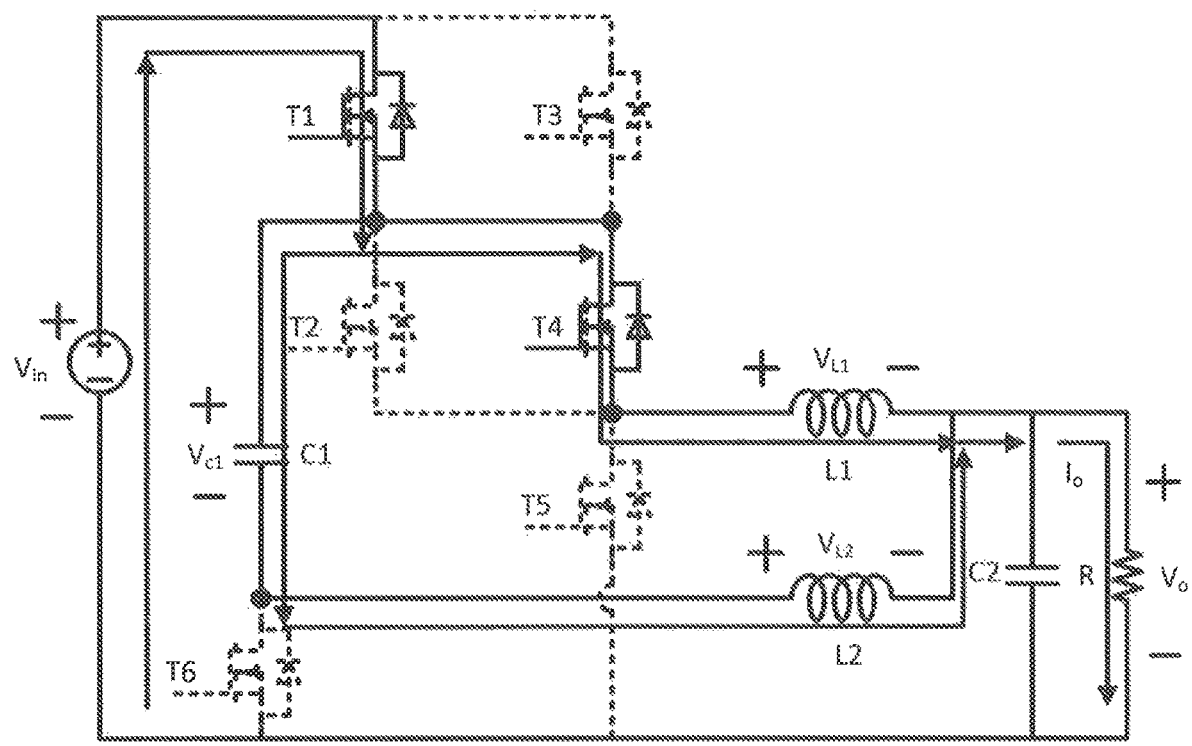
FIGS. 11-18 are circuit diagrams showing working modes 1-8, respectively, of a two-phase asymmetrical three-level buck converter operating under the input voltage boost control method, according to an embodiment of the invention.

Under the IVBC method, there are eight working states in one switching period. Each working state is explained as follows with reference to FIGS. 11-18:

State 1 ($t_0$-$t_1$) in FIG. 11: The switches T1 and T4 are on. The current in L1 flows as follows: DC→T1→T4→L1→R→DC. The voltage $V_{sw1}$ equals the DC power supply voltage $V_{in}$. That is, $V_{sw1}=V_{in}$. At the same time, the current in L2 flows as follows: DC→T1→C1→L2→R→DC. The first capacitor C1 is charged by the DC power supply. The voltage $V_{sw2}$ equals the DC power supply voltage $V_M$ minus the first capacitor voltage $V_{C1}$. That is, $V_{sw2}=V_{in}-V_{C1}=0.5V_{in}$. Both L1 and L2 are charged.

Figure 12:
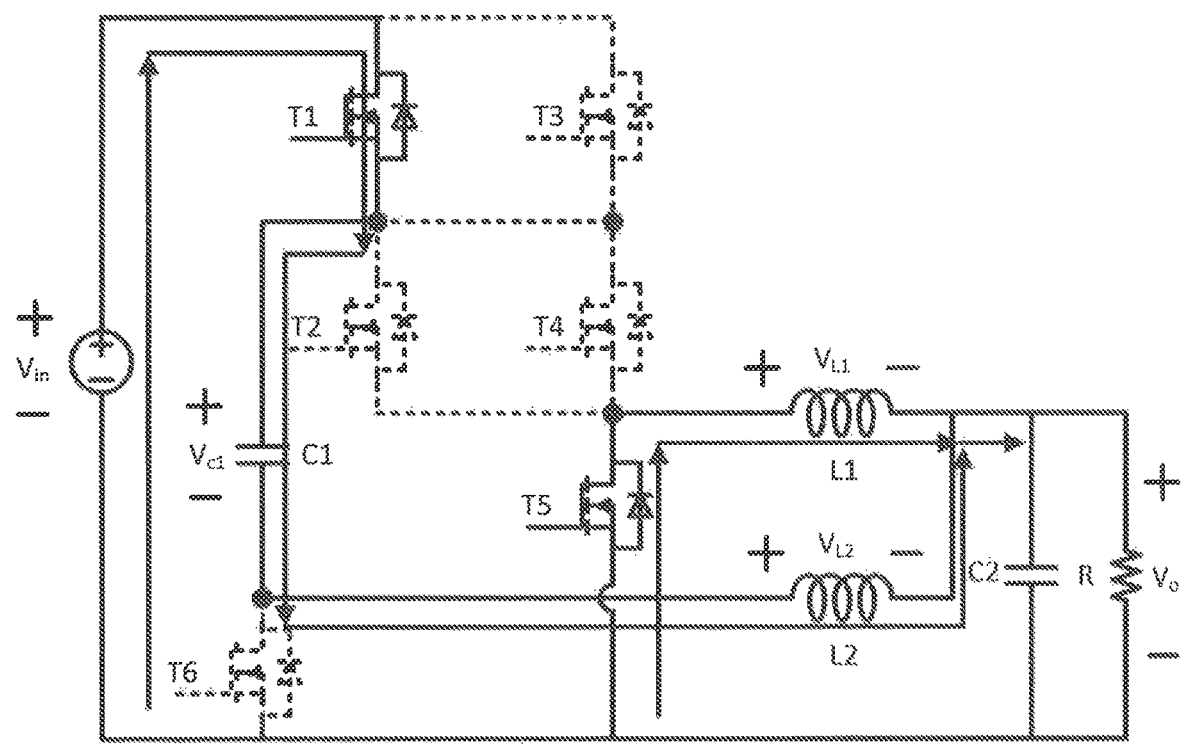

State 2 ($t_1$-$t_2$) in FIG. 12: The switches T1 and T5 are on. The inductor L1 works in freewheeling mode through the loop as follows: T5→L1→R→T5. The positive terminal of inductor L1 is grounded through T5. The voltage $V_{sw1}$ equals zero. That is, $V_{sw1}=0$. At the same time, the current in L2 flows as follows: DC→T1→C1→L2→R→DC. The first capacitor C1 is charged by the DC power supply. The voltage $V_{sw2}$ equals the DC power supply voltage $V_{in}$ minus the first capacitor voltage $V_{C1}$. That is, $V_{sw2}=V_{in}-V_{C1}=0.5V_{in}$. L2 is charged.

Figure 13:
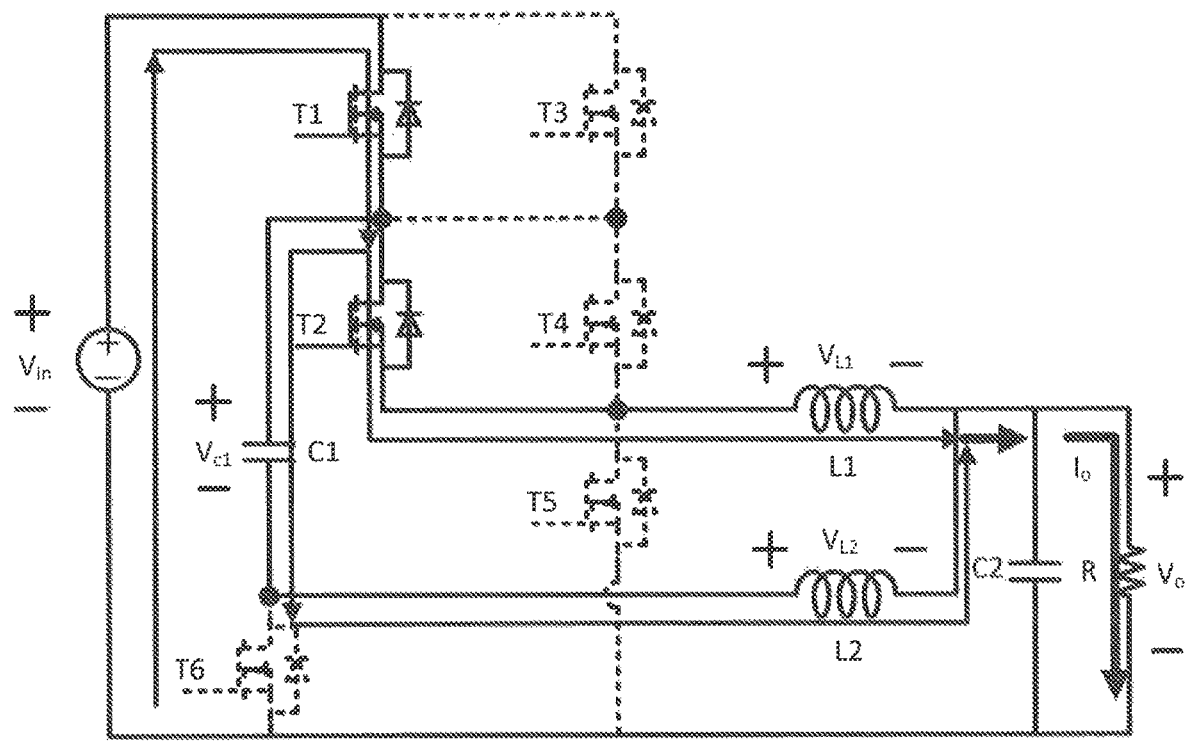

State 3 ($t_2$-$t_3$) in FIG. 13: The switches T1 and T2 are on. The current in L1 flows as follows:

DC→T1→T2→L1→R→DC. The voltage $V_{sw1}$ equals the DC power supply voltage $V_{in}$. That is, $V_{sw1}=V_{in}$. At the same time, the current in L2 flows as follows: DC→T1→C1→L2→R→DC. The first capacitor C1 is charged by the DC power supply. The voltage $V_{sw2}$ equals the DC power supply voltage $V_{in}$ minus the first capacitor voltage $V_{C1}$. That is, $V_{sw2}=V_{in}-V_{C1}=0.5V_{in}$. Both L1 and L2 are charged.

Figure 14:
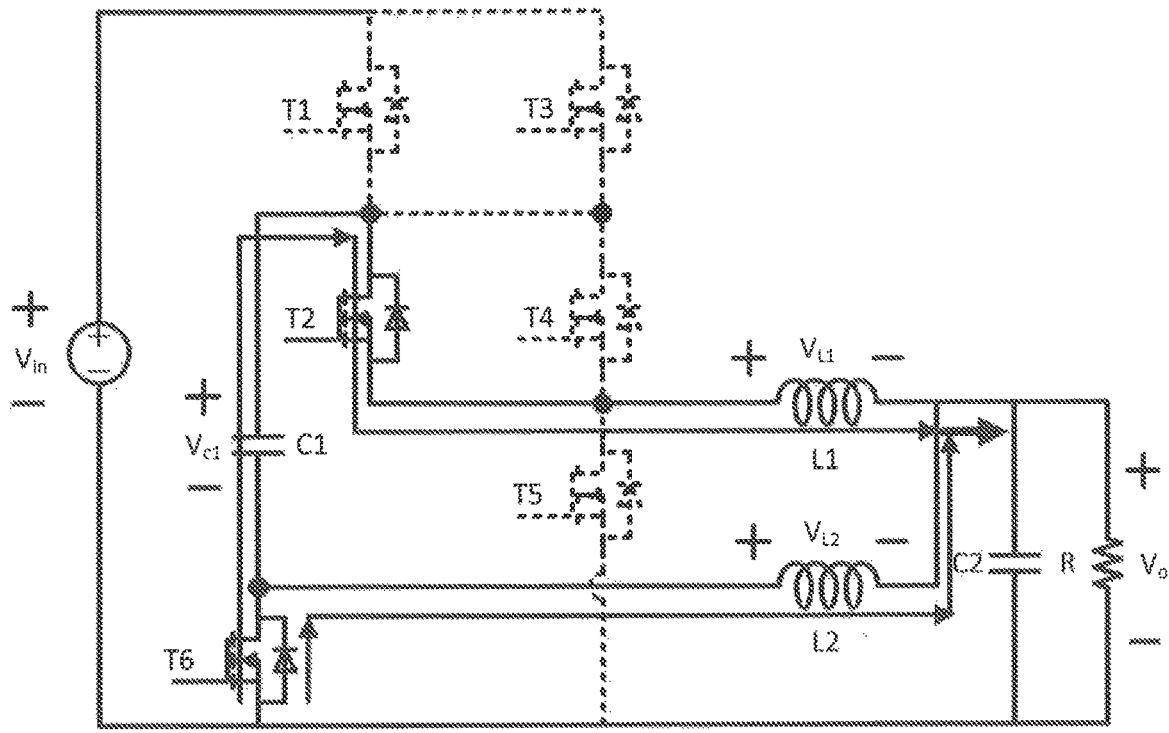

State 4 ($t_3$-$t_4$) in FIG. 14: The switches T2 and T6 are on. The current in L1 flows as follows: C1→T2→L1→R→T6→C1. The first capacitor C1 is discharged. The voltage $V_{sw1}$ equals the first capacitor voltage $V_{c1}$. That is, $V_{sw1}=V_{c1}$. At the same time, the inductor L2 works in freewheeling mode through the loop as follows: T6→L2→R→T6. The positive terminal of Inductor L2 is grounded through T6. The voltage $V_{sw1}$ equals zero. That is, $V_{sw2}=0$. L1 is charged and L2 freewheels.

Figure 15:
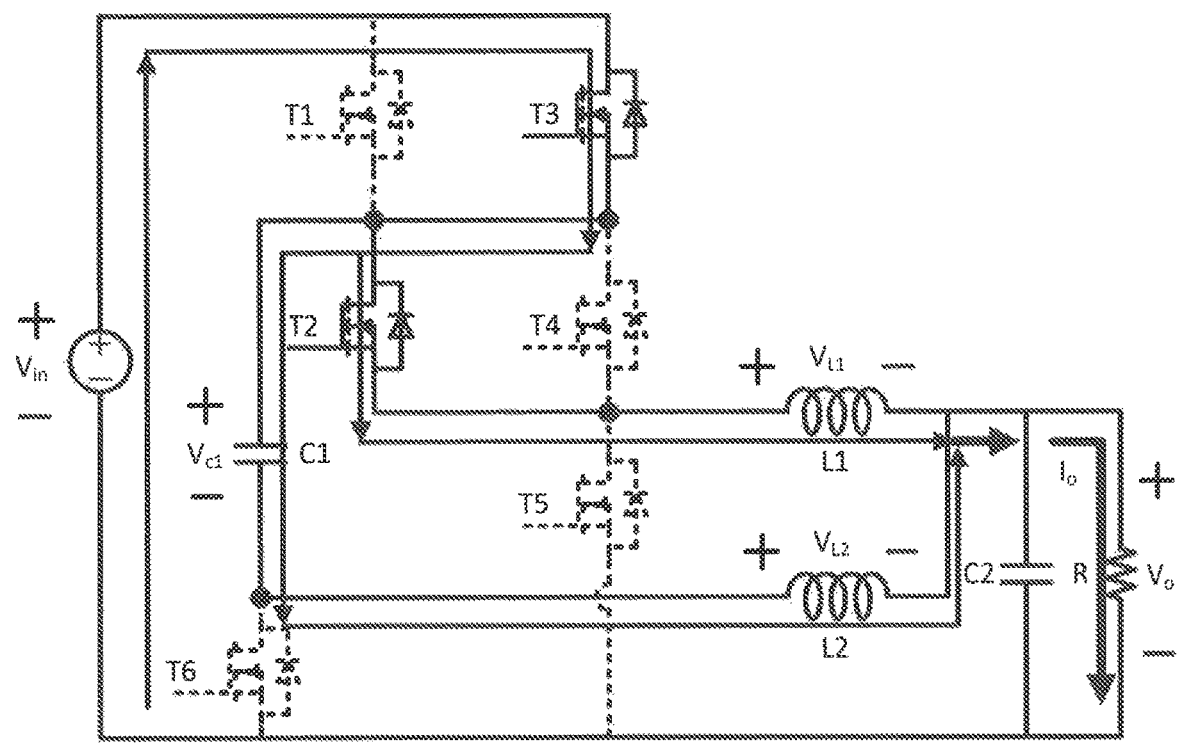

State 5 ($t_4$-$t_5$) in FIG. 15: The switches T2 and T3 are on. The current in L1 flows as follows: DC→T3→T2→L1→R→DC. The voltage $V_{sw1}$ equals the DC power supply voltage $V_{in}$. That is, $V_{sw1}=V_{in}$. At the same time, the current in L2 flows as follows: DC→T3→C1→L2→R→DC. The first capacitor C1 is charged by the DC power supply. The voltage $V_{sw2}$ equals the DC power supply voltage $V_{in}$ minus the first capacitor voltage $V_{C1}$. That is, $V_{sw2}=V_{in}-V_{C1}=0.5V_{in}$. Both L1 and L2 are charged.

Figure 16:
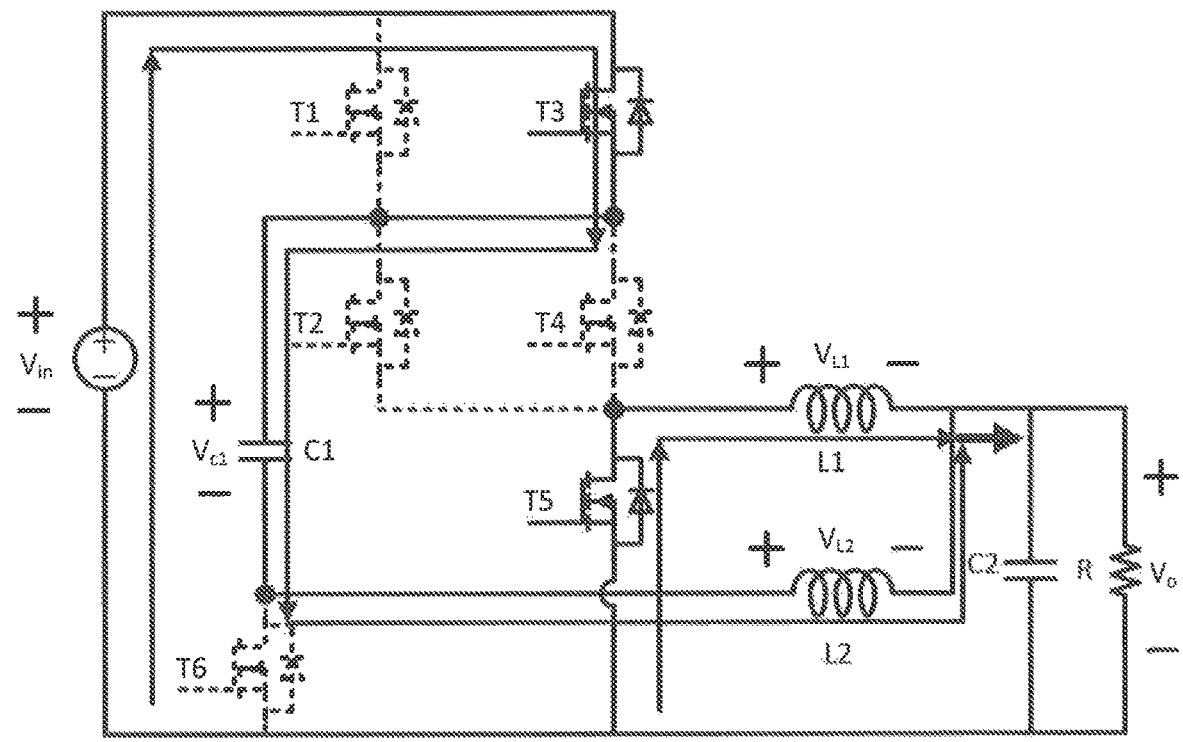

State 6 ($t_5$-$t_6$) in FIG. 16: The switches T3 and T5 are on. The inductor L1 works in freewheeling mode through the loop as follows: T5→L1→R→T5. The positive terminal of inductor L1 is grounded through T5. The voltage $V_{sw1}$ equals zero. That is, $V_{sw1}=0$. At the same time, the current in L2 flows as follows: DC→T3→C1→L2→R→DC. The first capacitor C1 is charged by the DC power supply. The voltage $V_{sw2}$ equals the DC power supply voltage $V_{in}$ minus the first capacitor voltage $V_{C1}$. That is, $V_{sw2}=V_{in}-V_{C1}=0.5V_{in}$. L2 is charged.

Figure 17:
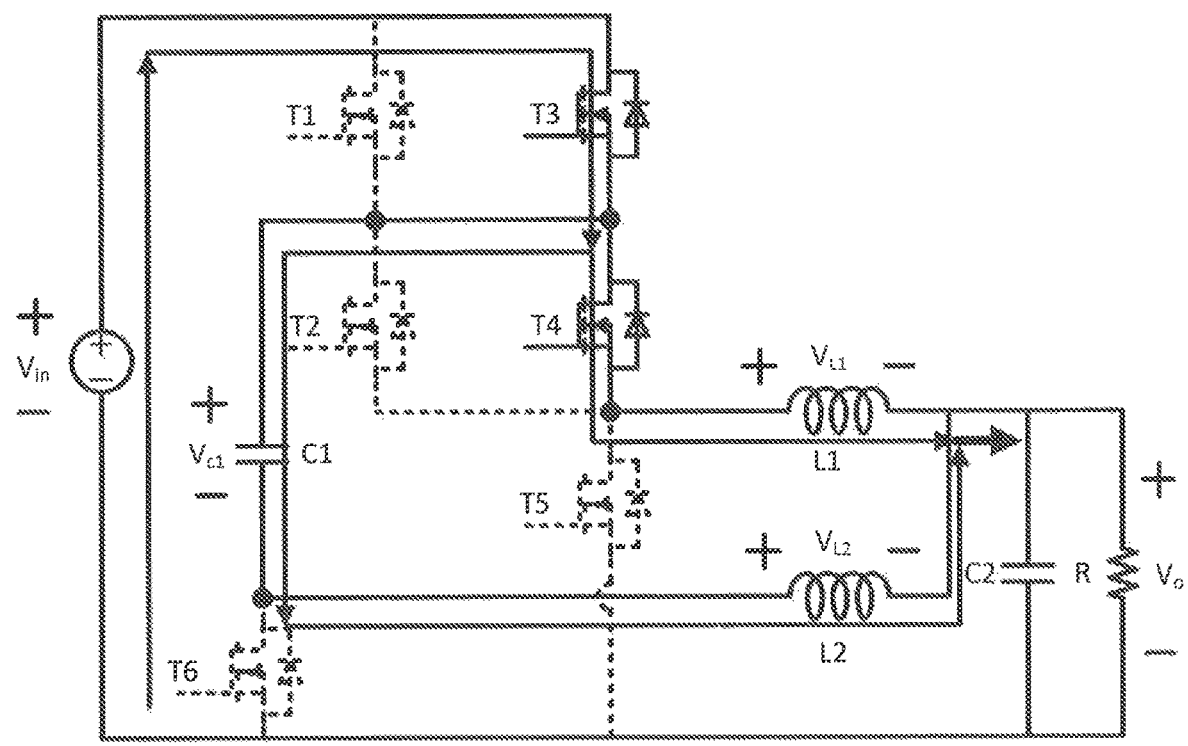

State 7 ($t_6$-$t_7$) in FIG. 17: The switches T3 and T4 are on. The current in L1 flows as follows: DC→T3→T4→L1→R→DC. The voltage $V_{sw1}$ equals the DC power supply voltage $V_{in}$. That is to say, $V_{sw1}=V_{in}$. At the same time, the current in L2 flows as follows: DC→T3→C1→L2→R→DC. The first capacitor C1 is charged by the DC power supply. The voltage $V_{sw1}$ equals the DC power supply voltage $V_{in}$ minus the first capacitor voltage $V_{C1}$. That is, $V_{sw2}=V_{in}-V_{C1}=0.5V_{in}$. Both L1 and L2 are charged.

Figure 18:
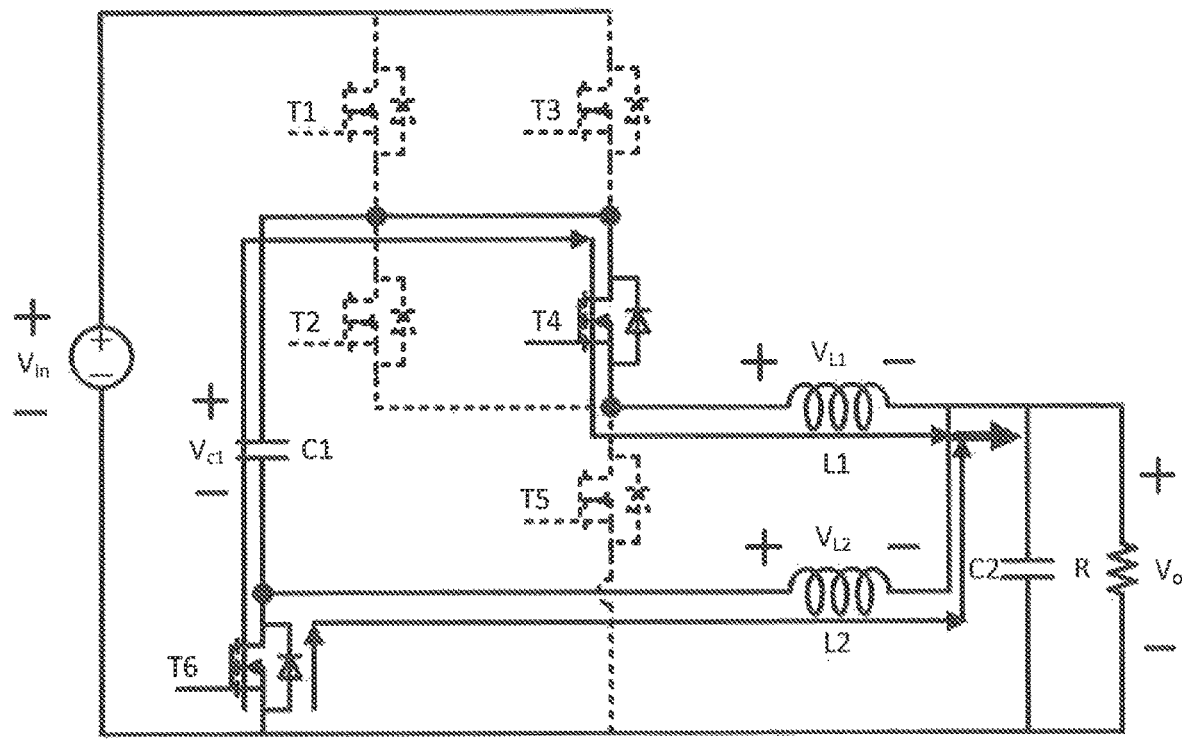

State 8 ($t_7$-$T_8$) in FIG. 18: The switches T4 and T6 are on. The current in L1 flows as follows: C1→T4→L1→R→T6→C1. The first capacitor C1 is discharged. The voltage $V_{sw1}$ equals the first capacitor voltage $V_{c1}$. That is, $V_{sw1}=V_{c1}$. At the same time, the inductor L2 works in freewheeling mode through the loop as follows: T6→L2→R→T6. The positive terminal of inductor L2 is grounded through T6. The voltage $V_{sw2}$ equals zero. That is, $V_{sw2}=0$. L1 is charged and L2 freewheels.

The duty cycle is expressed as in the above Equation (4) during normal operation and $D_{ATL}$ is not greater than 0.25. Under the IVBC method, the duty cycle will be different from the normal operating method described above.

During State 4 and State 8, the inductor voltage $V_{L1}$ is $V_c-V_o$. It can be seen from FIG. 10 that the total duty cycle of State 4 and State 8 is 0.5-2$D_{bt}$ during operation under IVBC. $D_{bt}$ is the duty cycle of one boost state.

During boost states 1, 3, 5, and 7, $V_{L1}$ is ($V_{in}-V_o$). The total duty cycle of these boost states is 4$D_{bt}$.

During freewheeling states 2 and 6, $V_{L1}$ is ($-V_o$). The total duty cycle of these states is 0.5-2$D_{bt}$.

Next, using of the principle of inductor volt-second balance on inductor L1 derives Equation (9).

$$\langle v_{L1} \rangle = (0.5-2D_{bt})\cdot(V_c-V_o)+4\cdot D_{bt}\cdot(V_{in}-V_o)+(1-0.5+ \\ 2\cdot D_{bt}-4\cdot D_{bt})\cdot(-V_o)=0 \tag{9}$$

By simplifying the Equation (9), $D_{bt}$ is obtained in Equation (10).

$$D_{bt} = \frac{2V_o - V_c}{8V_i - 4V_c} \tag{10}$$

Referring to FIG. 10, the new duty cycle in extended output voltage mode is 0.25+$D_{bt}$. Therefore, the duty cycle can be expressed in Equation (11).

$$D_{ATL} = \begin{cases} \dfrac{V_o}{V_{in}} & \text{when } 0 \leq \dfrac{V_o}{V_{in}} \leq \dfrac{1}{4} \\ \dfrac{2V_o - V_c}{8V_i - 4V_c} + 0.25 & \text{when } \dfrac{V_o}{V_{in}} > \dfrac{1}{4} \end{cases} \tag{11}$$

When $V_o/V_{in}$ is less than or equal to 0.25, the two-phase asymmetrical three-level buck converter works according to the normal operation described above. When $V_o/V_{in}$ is greater than 0.25, the IVBC method provides output higher voltage.

As the output current splits, each phase carries half of the output current. The two-phase asymmetrical three-level buck converter according to the embodiments described herein is particularly useful for high output current applications.

Controller Implementation

An IVBC controller may be implemented using voltage-mode control, current-mode control, hysteresis control, etc. Controller components may include an error amplifier that receives an input based on sensed converter output voltage or current, an error amplifier that produces an output error signal, a PWM circuit that receives the error signal and generates a duty cycle signal, and a gate drive logic circuit that produces gate drive signals based on the duty cycle signal. Of course, other configurations may also be used. The controller may be implemented in any combination of discrete and integrated components, digitally or analogue, or in a platform such as a field programmable gate array (FPGA), as known in the art.

Example 2

In this example another embodiment of the IVBC operating method is described, wherein the method is implemented in a two-phase three-level buck converter (also referred to as a series capacitor buck converter) as shown in FIG. 19.

As shown in FIG. 19, the series capacitor buck converter consists of four switches M1, M2, SR1, and SR2. M1 and M2 are control switches and SR1 and SR2 are synchronous rectifier switches (or SR switches). The drain of the first switch M1 is connected to the positive terminal of the input voltage, $V_{in}$. The source of the first switch is connected to both the positive terminal of the flying capacitor $C_1$ and the drain of the second switch M2. The source of M2 is connected to the drain of the third switch SR2 and a first terminal of the first inductor L1. The source of the third switch SR2 is connected to a circuit common, or ground. The drain of the fourth switch SR1 is connected to a first terminal of the second inductor L2 and the negative terminal of the flying capacitor $C_f$. The source of SR1 is connected to ground. Both of the second terminals of L1 and L2 are connected to the positive terminal of an output capacitor $C_o$. The negative terminal of the output capacitor is connected to ground. The load (RL) is connected between the positive terminal of the output capacitor $C_o$ and ground.

Under the conventional control strategy, the maximum duty cycle of a series capacitor buck converter is limited below 0.50 and the maximum output voltage is 25% of the input voltage. For example, the maximum output is 3V for a 12V input. In practice, when considering the power losses and the dead time, the maximum output voltage will be below 3V for a 12V input.

However, as described herein, the IVBC method may be used to achieve higher voltage gain for a series capacitor buck converter. For example, with the IVBC method, a series capacitor buck converter can produce commonly used voltage levels, such as 3.3V and 5V, using a 12V input voltage. A key feature of the IVBC method is to introduce another voltage level at the input of the inductor L1 (i.e., node B1 as shown in FIG. 19, Vsw1). The new voltage level is equal to Vin. In other words, three voltage levels are present at Vsw1: 0, 0.5Vin, and Vin.

Operation

Figure 20:
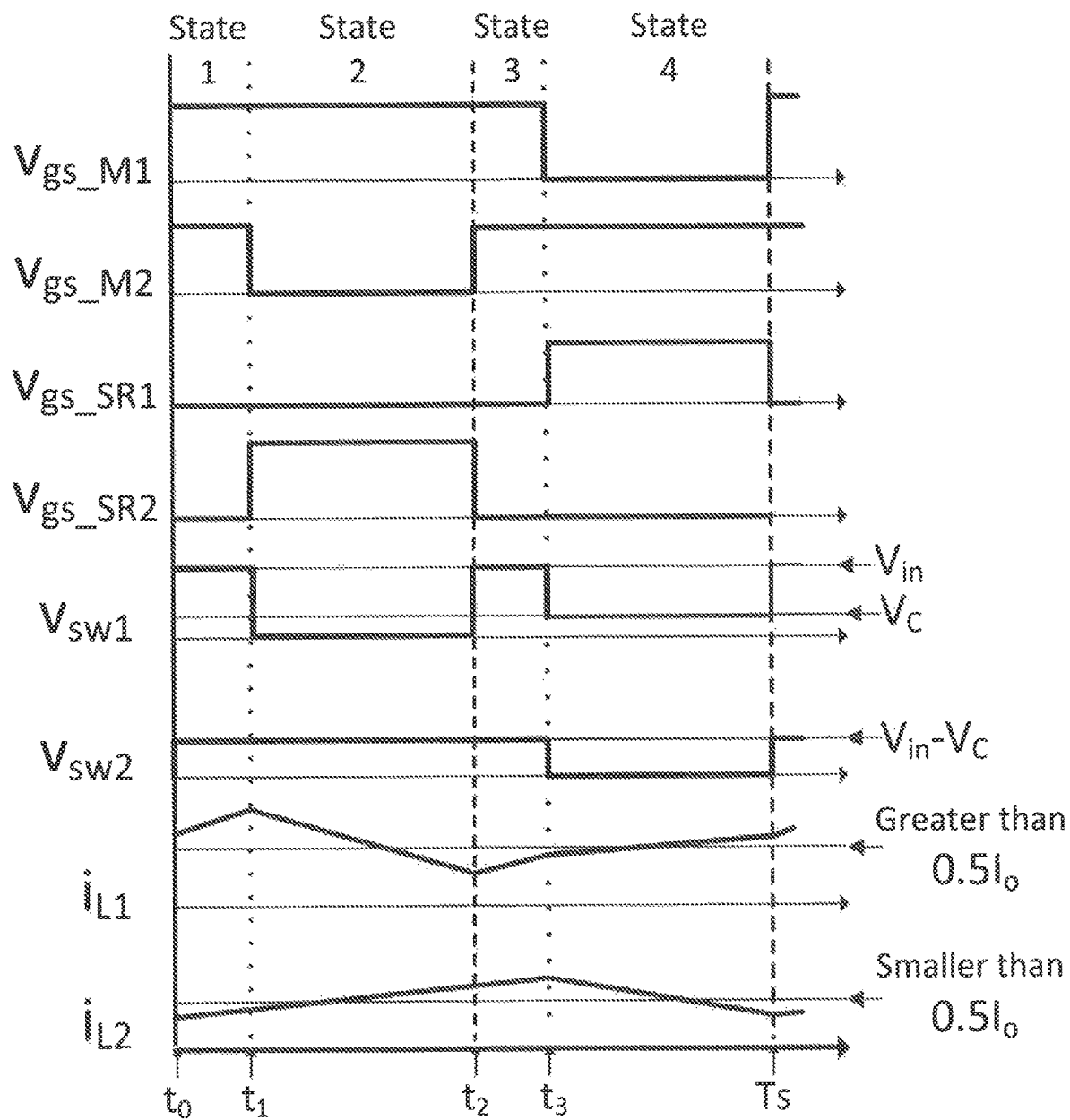
FIG. 20 is a timing diagram for the series capacitor buck converter of FIG. 19 operating under an input voltage boost control method, according to an embodiment of the invention.

The operating sequence of switches and typical waveforms under the IVBC method are shown in FIG. 20. It is assumed that the dead time is zero. Four operating states are identified during each switching period: State 1 (from t0 to t1), State 2 (from t1 to t2), State 3 (from t2 to t3), and State 4 (from t3 to Ts). The circuit operation is described below with reference to FIGS. 21-23, wherein dashed lines represent portions of the circuit that are not operating (i.e., the devices are off) during each state.

Figure 21:
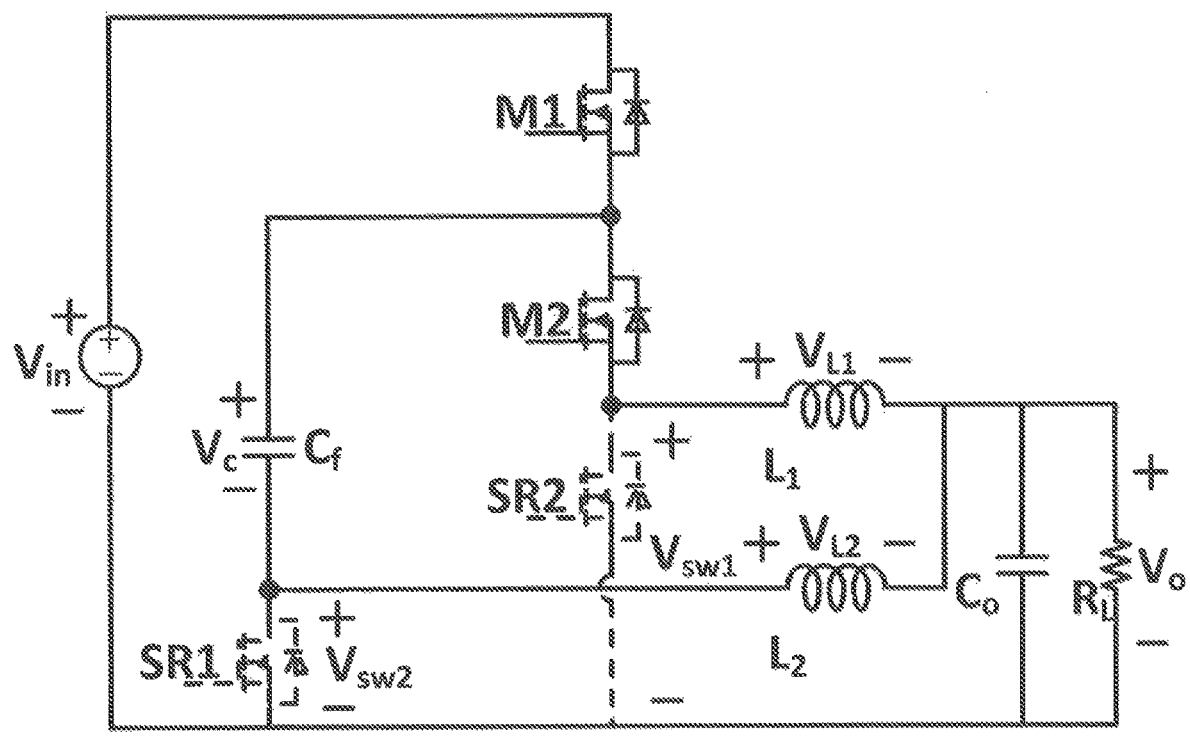
FIG. 21 is a circuit diagram showing working modes 1 and 3 for the series capacitor buck converter of FIG. 19 operating under an input voltage boost control method, according to an embodiment of the invention.

State 1 (from t0 to t1): The equivalent circuit is shown in FIG. 21. M1 is turned on at t0 and M2 is on. Therefore, M1 and M2 are on for this state. The first current path is $V_{in}$ to M1→M2→L1→Co and RL. The DC value of the inductor L1 current ($i_{L1}$) is more than half of the load current, which is different from the conventional control strategy for the series capacitor buck converter when only M1 or M2 is turned on. The second current path is $V_{in}$→M1→$C_f$→L2→$C_o$ and RL. The DC value of the inductor L2 current ($i_{L2}$) is less than half of the load current, which is also different from the conventional control strategy. The steady state currents for inductors L1 and L2 are given in Equations (17) and (18), below. The flying capacitor $C_f$ is charged by $i_{L2}$. During this period, the voltage at B1 is $V_{sw1}=V_{in}$. The voltage at B2 is $V_{sw2}=V_{in}-V_{cf}$. The value of $V_{cf}$ may be calculated by Equation (12). The inductor L1 voltage is Vin−Vo and the inductor L2 voltage is $V_{in}-V_{cf}-V_o$. Equation (13) gives the output voltage value.

$$V_{cf} = \begin{cases} \dfrac{V_{in}}{2} & \text{when } 0 \le D \le 0.5 \\ V_{in} - \dfrac{V_o}{D} & \text{when } 0.5 < D \le 1 \end{cases} \quad (12)$$

$$V_o = \begin{cases} \dfrac{DV_{in}}{2} & \text{when } 0 \le D \le 0.5 \\ D(V_{in} - V_{cf}) & \text{when } 0.5 < D \le 1 \end{cases} \quad (13)$$

Figure 22:
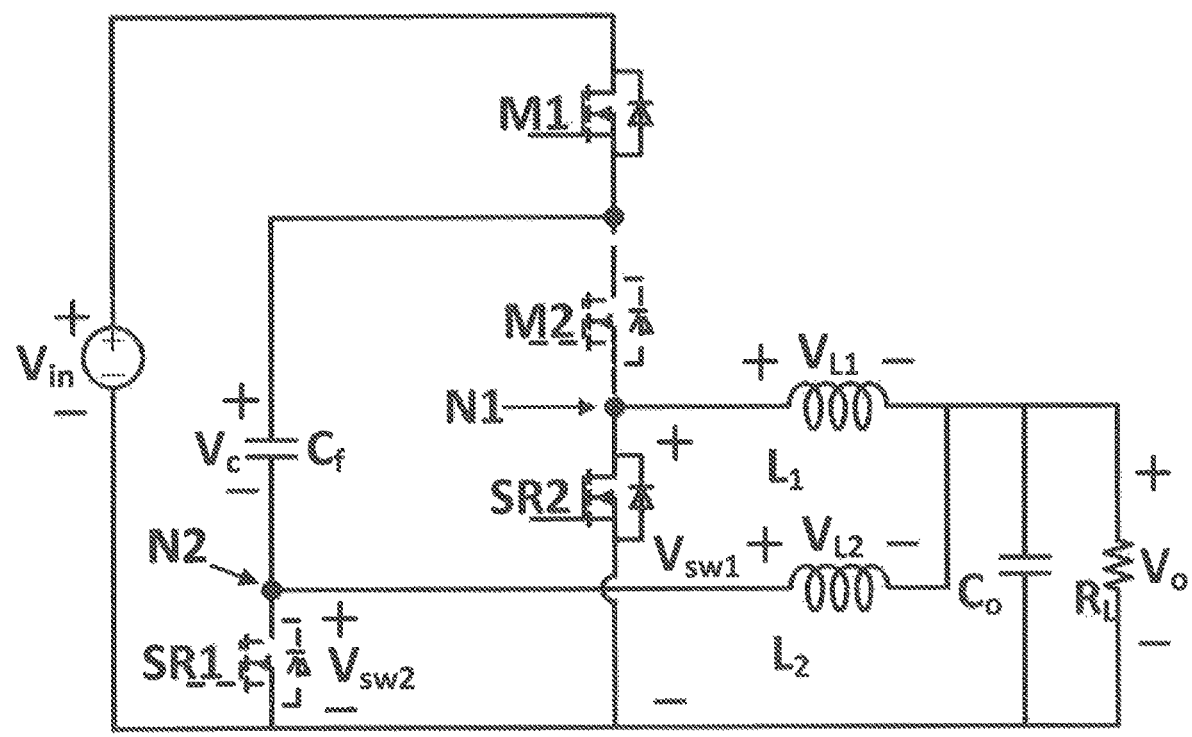
FIGS. 22 and 23 are circuit diagrams showing working modes 2 and 4, respectively, for the series capacitor buck converter of FIG. 19 operating under an input voltage boost control method, according to an embodiment of the invention.

State 2 (from t1 to t2): The equivalent circuit is shown in FIG. 22. M2 is turned off at t=t1. SR2 is turned on immediately after M2 is turned off. M1 remains on. In this operation state, one control switch (M1) and one SR (SR2) are on. The first current path is: Vin→M1→Cf→L2→Co and RL. The amplitude of the current is the current of inductor L2 ($i_{L2}$), which is less than half of the load current. The flying capacitor $C_f$ is charged by $i_{L2}$. The second current path is: SR2→L1→Co and RL. The amplitude of the current is the current of inductor L1 ($i_{L1}$), which is more than half of the load current. During this period, the voltage at B1 is $V_{sw1}=0$. The voltage at B2 is $V_{sw2}=V_{in}-V_{cf}$. The inductor L1 voltage is −Vo and the inductor L2 voltage is Vin−Vcf−Vo.

State 3 (from t2 to t3): The equivalent circuit is shown in FIG. 21. In this state, t2 is half the switching period Ts, t2=0.5Ts. At t=t2, SR2 is turned off and M2 is turned on immediately after SR2 is turned off. M1 is still on. In this operation state, both control switches (M1 and M2) are on. The first current path is Vin→M1→M2→L1→Co and RL. The amplitude of the current is the current of inductor L1 ($i_{L1}$), which is more than half of the load current and this is different from the conventional control. The second current path is Vin→M1→Cf→L2→Co and RL. The amplitude of the current is the current of inductor L2 ($i_{L2}$), which is less than half of the load current. The flying capacitor $C_f$ is charged by $i_{L2}$. The DC value of the inductor currents may be determined using Equations (17) and (18). During this period, the voltage at B1 is $V_{sw1}=V_{in}$. The voltage at B2 is $V_{sw2}=V_{in}-V_{cf}$. The inductor L1 voltage is Vin−Vo and the inductor L2 voltage is Vin−Vcf−Vo.

Figure 23:
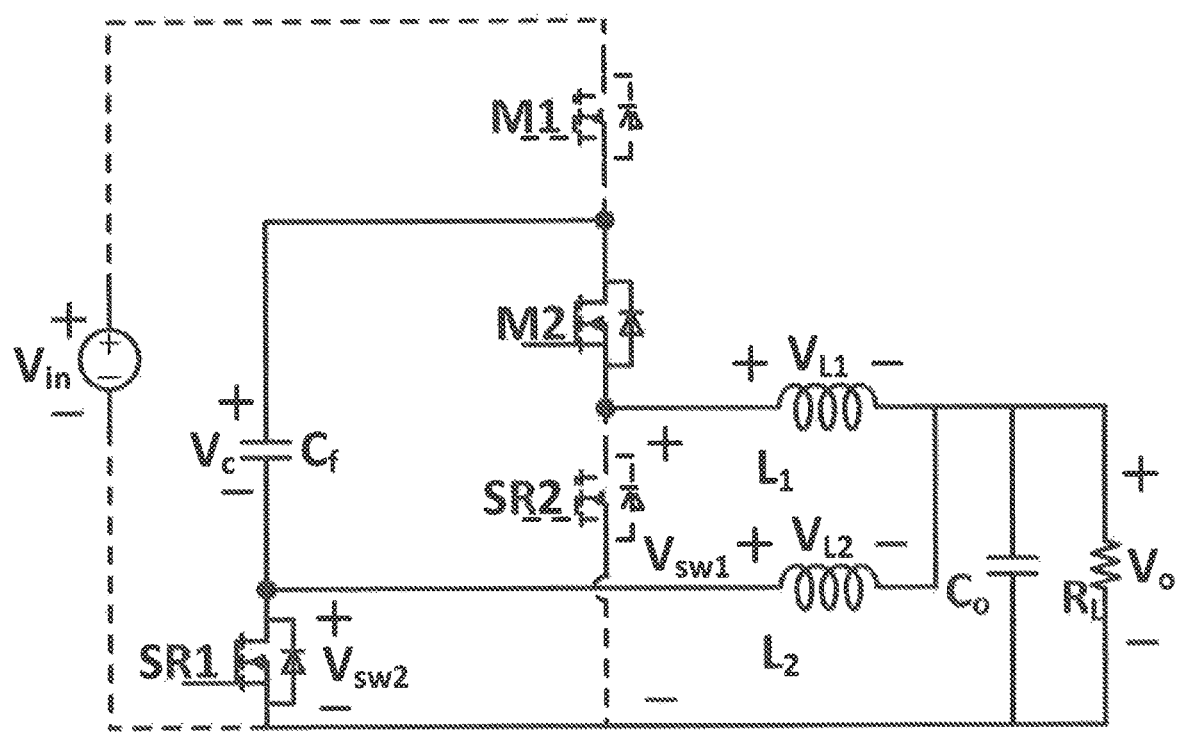

State 4 (from t3 to Ts): The equivalent circuit is shown in FIG. 23. M1 is turned off at t=t3. SR1 is turned on immediately after M1 is turned off. M2 remains on. In this operation state, one control switch (M2) and one SR (SR1) are on. The first current path is: SR1→$C_f$→M2→L1→Co and RL. The amplitude of the current is the current of inductor L1 ($i_{L2}$), which is more than half of the load current. The flying capacitor $C_f$ is discharged by $i_{L2}$. The second current path is: SR1→L2→Co and RL. The amplitude of the current is the current of inductor L2 ($i_{L2}$), which is less than half of the load current. During this period, the voltage at B1 is $V_{sw1}=V_{cf}$. The voltage at B2 is $V_{sw2}=0$. The inductor L1 voltage is $-V_{cf}$ and the inductor L2 voltage is −Vo.

State 4 finishes at t=Ts when SR1 is turned off and M1 is turned on immediately after SR1 is turned off. The cycle repeats the operation in the next switching period.

Simulation Results

Two simulations were conducted using PSIM (Powersim Inc., Rockville, USA). The following circuit parameters were used: switching frequency 2 MHz, L1 and L2 220 nH, Co 600 µF, and Cf 10 µF.

Figure 24A:
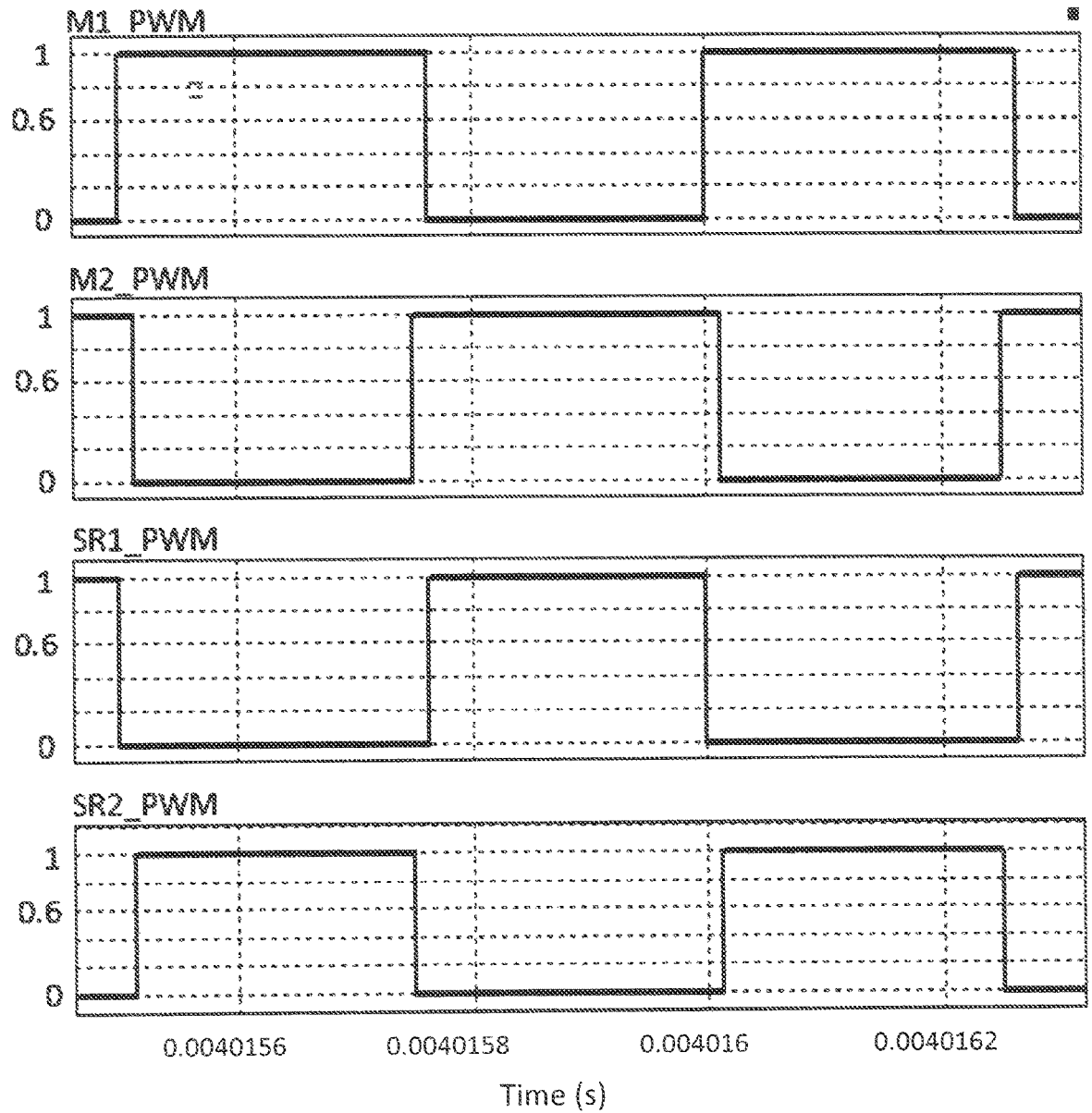
FIGS. 24A and 24B are plots showing results of a simulation of a series capacitor buck converter operating according to the timing diagram of FIG. 20.
Figure 24B:
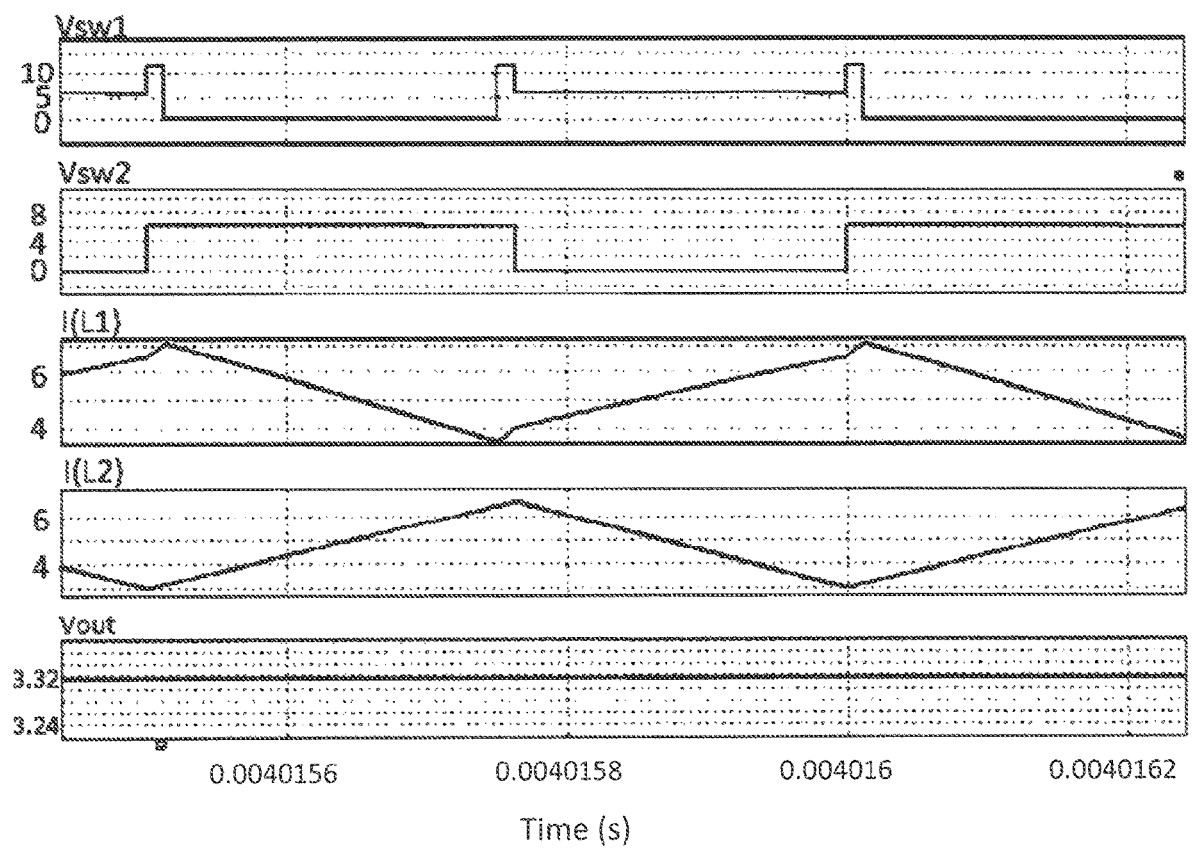

FIG. 24A shows the gate drive signals for four switches (M1, M2, SR1, and SR2), and FIG. 24B shows the simulation results for 12V input voltage and 3.3V output voltage. The duty cycle is about 52.6% (i.e., larger than 50%). The output voltage is about 3.3V, as shown in the last plot of FIG. 24B.

FIG. 24B shows the waveforms at key points. It is clearly shown that Vsw1 has three voltage levels, 0V, about 6V (i.e., about half of the input voltage) and about 12V (i.e., the input voltage). The voltage Vsw2 has only two voltage levels, about 0V and about 6V. Thus, under the IVBC strategy, Vsw1 and Vsw2 have different waveforms, which is different from the conventional control strategy where the voltage waveforms for Vsw1 and Vsw2 are the same, and are merely 180 degrees out of phase.

Figure 25A:
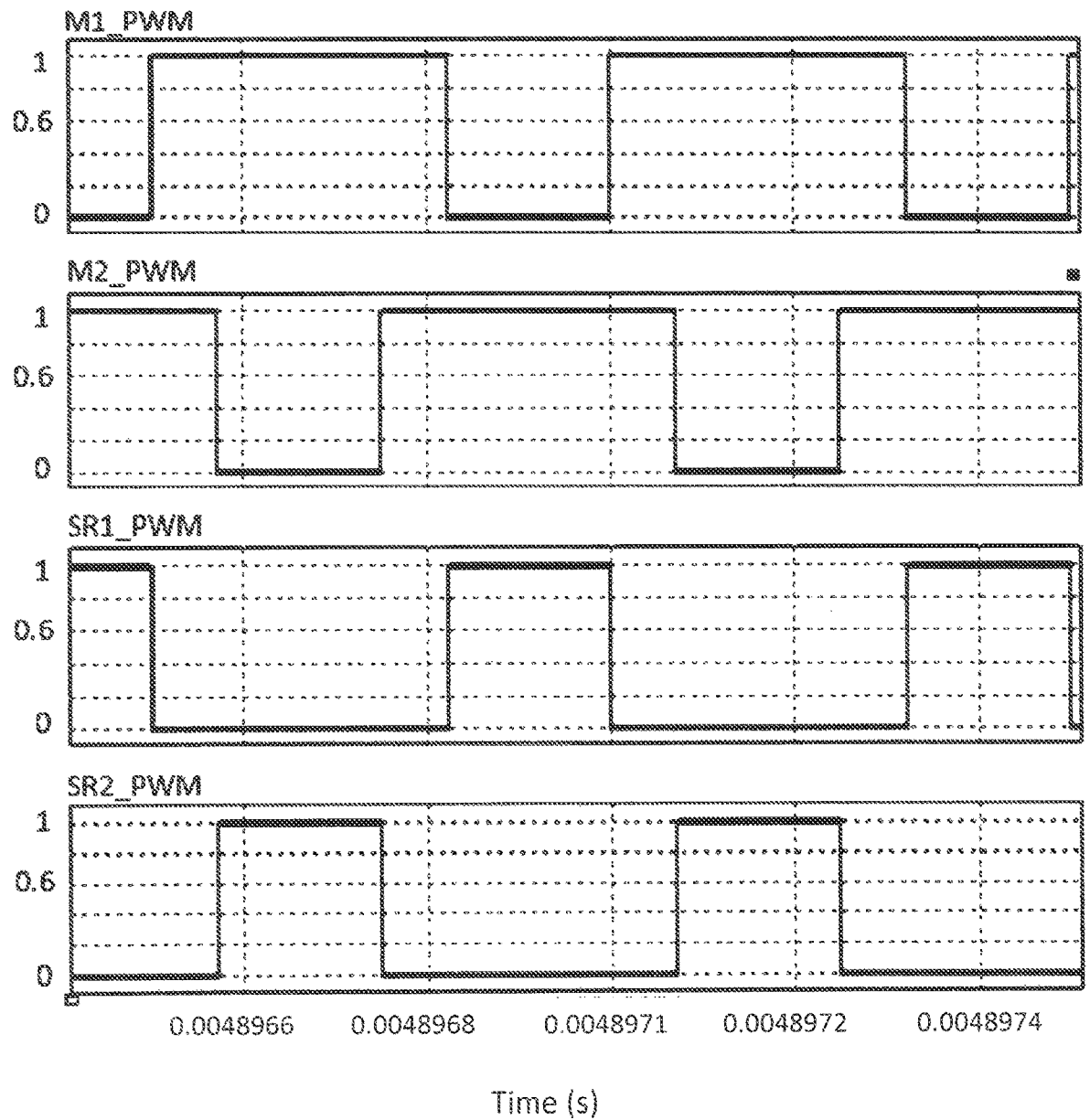
FIGS. 25A and 25B are plots showing results of a further simulation of a series capacitor buck converter operating according to the timing diagram of FIG. 20.
Figure 25B:
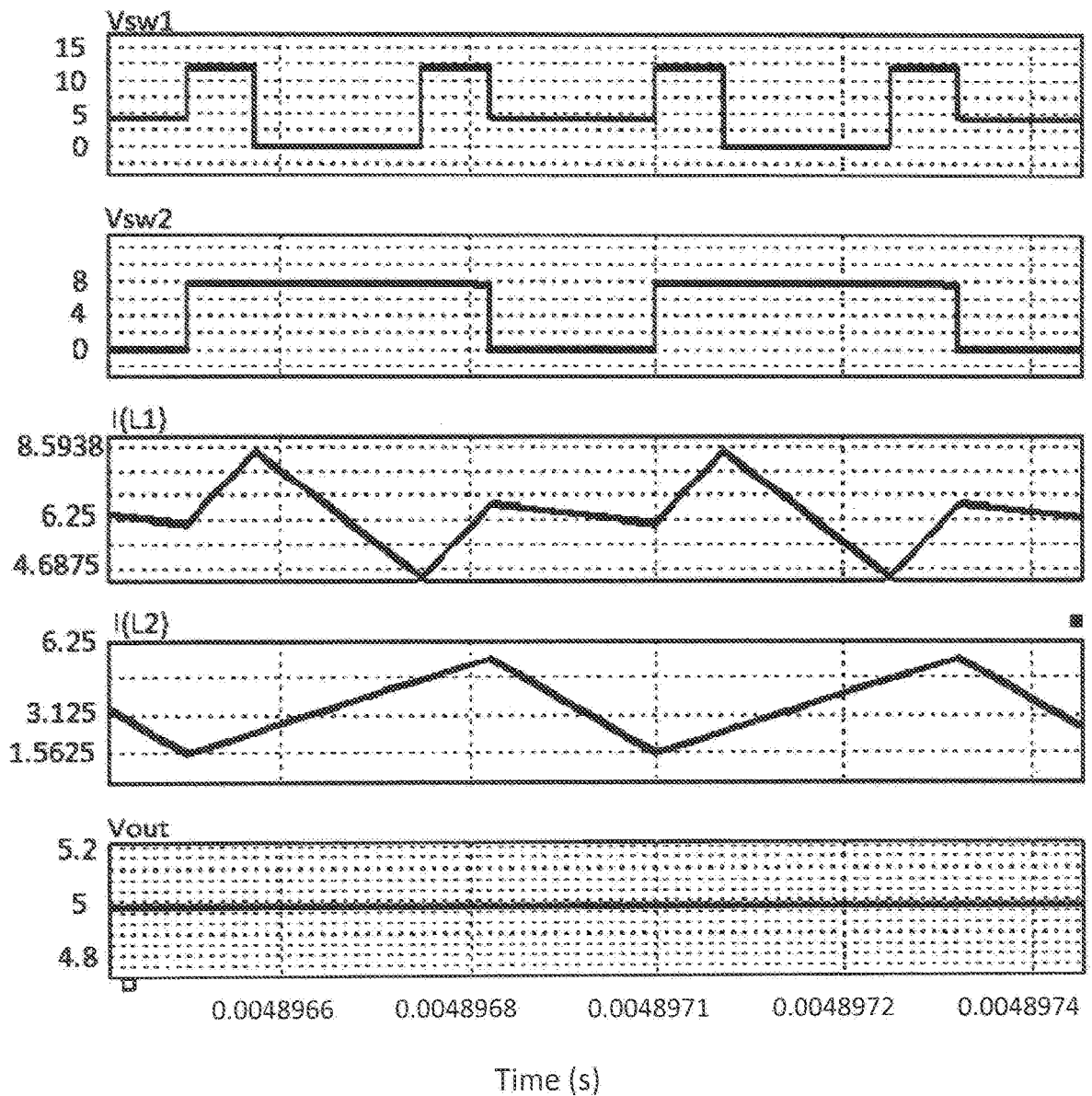

FIGS. 25A and 25B show simulation results for 12V input voltage and 5V output voltage. FIG. 25A shows the gate drive signals for four switches (M1, M2, SR1, and SR2). The duty cycle is about 64.5% (i.e., larger than 50%). FIG. 25B shows the waveforms at key points. It is clearly shown that Vsw1 has three voltage levels, 0V, about 6V (half of the input voltage) and about 12V (the input voltage). The output voltage is about 5V, as shown in the last plot of FIG. 25B.

Summary of the IVBC Strategy

In the conventional PWM control method of the series capacitor buck converter, the input voltages to L1 are 0 and Vc (which is equal to half of Vin). In contrast, as shown in the operating principle above, the control scheme of IVBC changes the input voltage of one of the inductors (L1) to 0, Vc, and Vin. The new input voltage level of Vin enables the converter to increase the output voltage level. Within one switching period, during two states (State 1 and State 3), the input voltage to L1 (Vsw1) is Vin. State 1 and State 3 may therefore be referred to as boost states in the IVBC strategy. The duration of a boost state is D−0.5. It is noted that a boost state occurs when the duty cycle is higher than 50%, or equivalently, the output voltage is higher than about Vin/4.

The control strategy with IVBC may be summarized as follows:

When the duty cycle is less than 50%, the operation of the IVBC strategy is same as the conventional control strategy.

When the duty cycle is larger than 50%, the IVBC strategy may be used to achieve higher output voltage.

Figure 26:
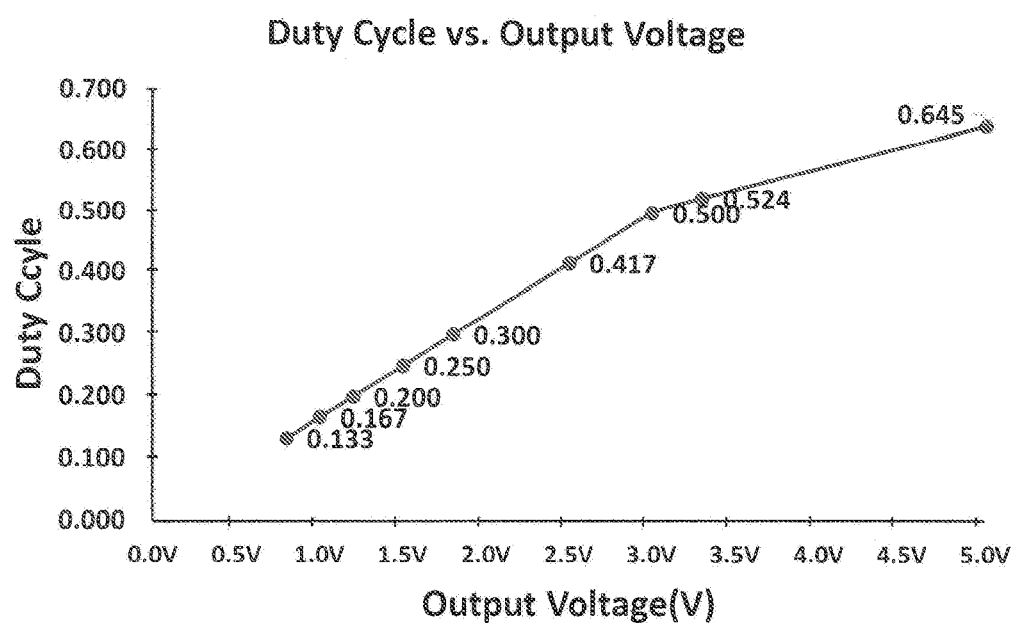
FIG. 26 is a plot showing a relationship between duty cycle and output voltage for a series capacitor buck converter operating according to the timing diagram of FIG. 20.

FIG. 26 is a plot showing the duty cycle for commonly used output voltages when the input voltage is 12V. For example, a duty cycle of 0.416 is needed if the output voltage is 2.5V. In this case, the series capacitor buck converter (FIG. 19) operates according to the conventional control mode. In other words, Vsw1 will have only two voltage levels, 0V and 0.5Vin. When the required output voltage is 3.3V, the duty cycle should be about 52.4%, and the circuit operates according to the IVBC operating mode. Vsw1 will have three voltage levels, 0V, 0.5Vin, and Vin. It is noted that the relationship given in FIG. 26 is under ideal conditions. In practice, the required duty cycle will be a little larger to compensate for losses in the circuit and the dead times.

Inductor Current DC Value and Ripple

When the duty cycle is larger than 50%, IVBC operation is used and the inductor ripple current and DC current may be calculated using the following equations. Under IVBC operation, the current of $L_1$ will rise faster during boost states since the input voltage to $L_1$ is $V_{in}$ instead of $V_c$. The inductor current ripple of $L_1$, $\Delta i_{L1}$ may be calculated using Equation (14), where $t_{L1}$ is the charging time of inductor current $i_{L1}$ (i.e., t0 to t1, or t2 to t3). In the equation $D_b$=D−0.5.

$$\Delta i_{L1} = \frac{V_{L1}}{L_1} t_{L1} = \frac{V_c - V_o}{L_1} \cdot (1-D)T_s + \frac{V_{in} - V_o}{L_1} 2D_b \cdot T_s \quad (14)$$

Equation (14) may be simplified and $\Delta i_{L1}$ calculated as follows:

$$\Delta i_{L1} = \frac{V_o \cdot (1-D)T_s}{L_1} \quad (15)$$

Similarly, the current ripple of $L_2$, $\Delta i_{L2}$ may be derived using Equation (16), where $t_{L2}$ is the charging time of inductor current $i_{L2}$ (i.e., t1 to t2). The current of $L_2$ rises in a constant slope during charging since the input voltage to $L_2$ does not change during the boost state.

$$\Delta i_{L2} = \frac{V_{L2}}{L_2} t_{L2} = \frac{V_{in} - V_c - V_o}{L_2} \cdot D \cdot T_s \quad (16)$$

The DC value of the inductor current $L_1$ and $L_2$ are given in the following two equations:

Inductor $L_1$ DC current value:

$$I_{L1} = \begin{cases} \frac{I_o}{2} & \text{when } 0 \leq D \leq 0.5 \\ DI_o & \text{when } 0.5 < D \leq 1 \end{cases} \quad (17)$$

Inductor $L_2$ DC current value:

$$I_{L2} = \begin{cases} \frac{I_o}{2} & \text{when } 0 \leq D \leq 0.5 \\ (1-D)I_o & \text{when } 0.5 < D \leq 1 \end{cases} \quad (18)$$

For example, a duty cycle of 0.416 is needed if the output voltage is 2.5V and the output current is 10 A. In this case $I_{L1}$ and $I_{L2}$ are approximately equal: $I_{L1}$ is 5 A and $I_{L2}$ is 5 A. When the output voltage is 3.3V, a duty cycle of 0.524 is needed. For this case, $I_{L1}$ is about 5.24 A and $I_{L2}$ is about 4.76 A. Similarly, D=0.645 is needed for an output voltage of 5V, where $I_{L1}$ is about 6.45 A and $I_{L2}$ is about 3.55 A.

Implementation of a IVBC Controller

Figure 27:
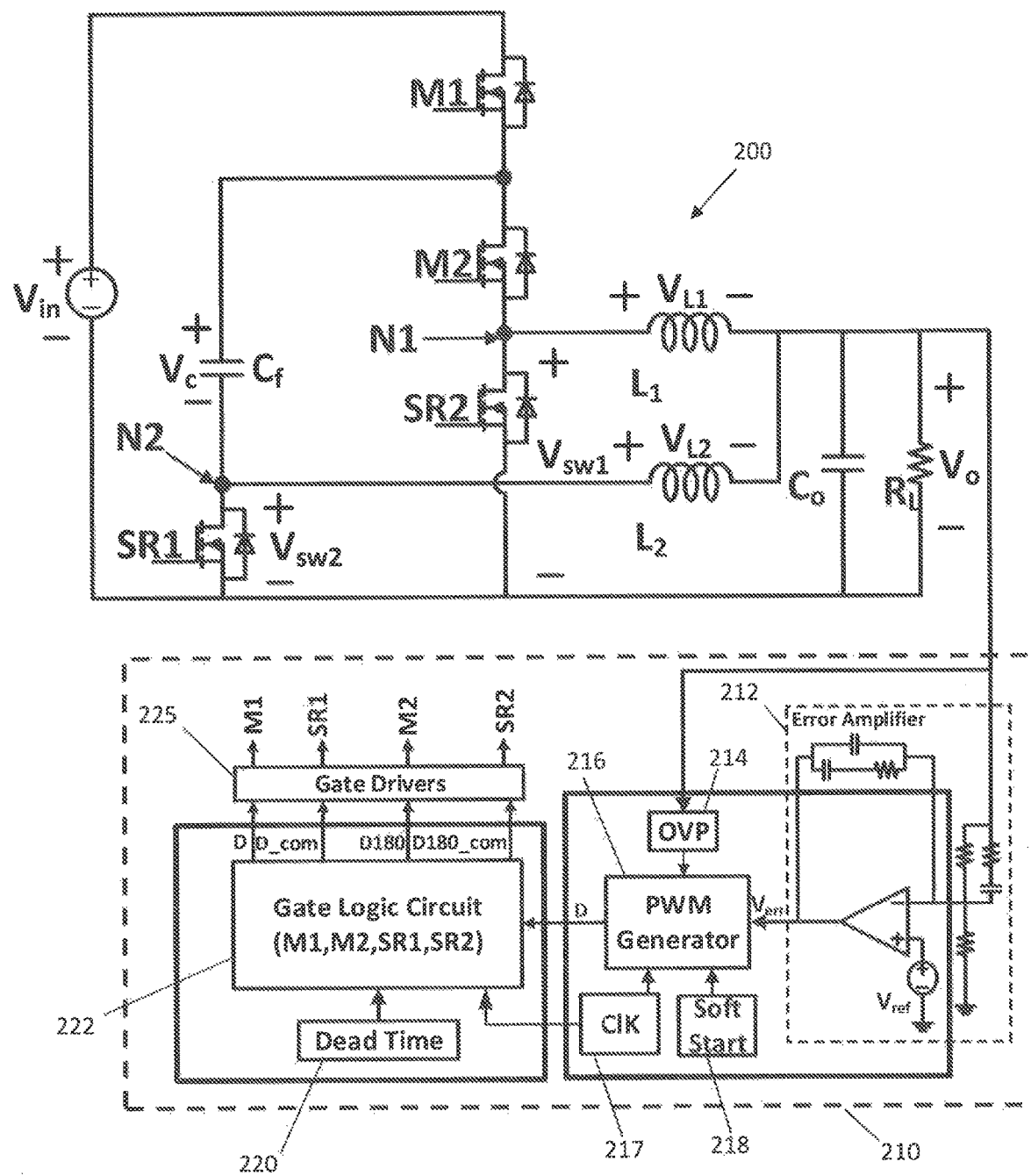
FIG. 27 is a circuit diagram showing an implementation of a controller for a series capacitor buck converter, according to one embodiment.

An IVBC controller may be implemented by modifying a conventional controller for a series capacitor buck converter. For example, controller components such as the error amplifier and most of the gate drive logic circuit may be employed in IVBC embodiments, such as voltage-mode control, current-mode control, hysteresis control, constant on time control, etc. FIG. 27 shows an embodiment of a voltage-mode controller 210. In this embodiment, Vout (i.e., Vo) of a series capacitor buck converter 200 is sensed and fed into an error amplifier 212 and over-voltage protection (OVP) circuit 214 of the voltage-mode controller 210. A PWM 216 receives an error signal $V_{err}$ from the error amplifier 212 and an output from the OVP circuit 214, as well as clock 217 and soft-start 218 signals, and generates a duty cycle D. A gate logic circuit 222 generates the required gate drive signals for the gate drivers 225 based on the duty cycle D and dead time 220.

In one embodiment the gate logic circuit operates as follows:

(1) The duty cycle D signal is used to control M1.
(2) A signal complementary to D (D_com) is generated and used to control SR1.
(3) A dead time is added between the M1 gate signal and the SR1 gate signal when both M1 and SR1 are off.
(4) The duty cycle D signal is delayed by half a switching period Ts (i.e., delayed by 180° in phase). The signal is referred to as D180 and is used to control M2.
(5) A signal complementary to D180 (D180_com) is generated and used to control SR2.
(6) A dead time is added between the M2 gate signal and the SR2 gate signal.
(7) No 50% duty cycle limitation is added, so that the duty cycle can be higher than 50%.

Figure 28:
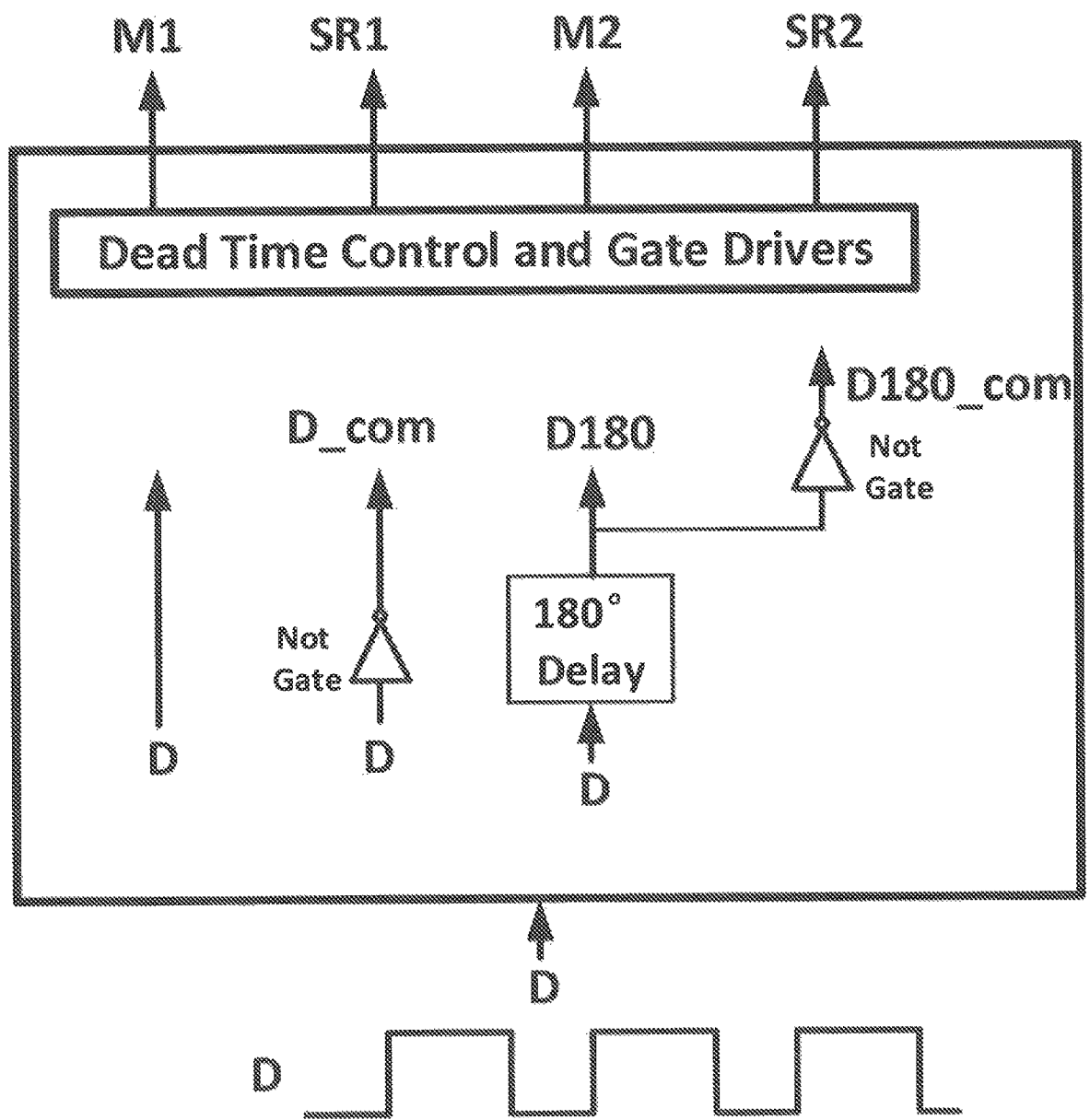
FIG. 28 is a diagram showing gate logic elements for the controller of FIG. 27, according to one embodiment.

FIG. 28 is a diagram showing details of the gate logic circuit 222 according to this embodiment. It is noted that the conventional control strategy would include a 50% limit circuit in the gate logic circuit to limit the maximum duty cycle to 50%.

The duty cycle D for M1 and M2 are substantially the same. The duty cycle for SR1 and SR2 are substantially same, and are 1-D. Also, there is no limitation on the maximum value of the duty cycle of the PWM signals. One group of PWM signals is used to drive M1 and its complementary pair SR1, and the delayed group of PWM signals is used to drive M2 and its complementary pair SR2. Since the duty cycle for switch M1 can be higher than 50%, the switch M2 can be turned on even if the switch M1 is not turned off. In this way, the PWM signals for M1 and M2 overlap as shown in FIG. 20. The input voltage to L1 will be $V_{in}$ during the boost state of operation. It will be appreciated that this control strategy may be implemented in any multi-phase multi-level converter topology, such as, but not limited to, single-phase three level converter (e.g., FIG. 1A), and three-phase four level converter, to extend the conversion ratio.

As described herein, the IVBC strategy increases the output voltage by introducing different input voltages ($V_{sw1}$ and $V_{sw2}$) to two inductors (L1 and L2). The input voltage for L2 ($V_{sw2}$) is same as in the conventional control strategy when the maximum duty cycle is limited to 50%, and still has two voltage levels, 0V and 0.5Vin. The IVBC strategy introduces three voltage levels for the input voltage of L1 (Vsw1), 0V, 0.5Vin, and $V_{in}$. Therefore, the input voltages to the two inductors, $V_{sw1}$ and $V_{sw2}$, are different. This feature of the IVBC strategy results in the higher output voltage for the series capacitor buck converter.

As compared with the conventional control strategy for the series capacitor buck converter, the proposed IVBC strategy extends the duty cycle to be higher than 50%, to introduce a third voltage level ($V_{in}$) at the input of the inductor L1 ($V_{sw1}$) so that the output voltage can be increased. In order to achieve this, the duty cycles of M1 and M2 (two control MOSFETs) are extended to above 50% so that both M1 and M2 are conducting at same time, as shown in FIG. 20. The gate drive for SR1 is complementary to the gate drive of M1 so that when M1 is on, SR1 is off, and when and M1 is off, SR1 is on. Similarly, when M2 is on, SR2 is off and M2 is off, SR2 is on. In a practical implementation, there is a small dead time between M1 and SR1 when both M1 and SR1 are off. There is also a small dead time between M2 and SR2 when both are off.

In another embodiment, operation mode of the gate logic circuit is described as follows:
(1) At the start of the switching cycle Ts, M1 is turned on. Immediately before M1 is turned on, SR1 is turned off.
(2) M1 is on for a period Ton (Ton=D*Ts) and is then turned off. Immediately after M1 is turned off, SR1 is turned on.
(3) At the middle of the switching cycle (0.5Ts), M2 is turned on. Immediately before M2 is turned on, SR2 is turned off.
(4) M2 is on for a period Ton (Ton=D*Ts) and then is turned off. Immediately after M2 is turned off, SR2 is turned on.
(5) If Ton is smaller than 0.5Ts (i.e., half of the switching period) or D is less than 50%, M1 will be turned off before M2 will be turned on, therefore, the operation of the converter will be same as the conventional operation. When Ton is larger than 0.5Ts (half of the switching period), or D is larger than 50%, M1 will still be on when M2 is turned on. During this time interval, both M1 and M2 are on and voltage Vsw1 will be Vin. Therefore, a higher voltage is applied to the input of Inductor L1 and an increased output voltage is achieved.

A circuit diagram of a controller to implement the above embodiment is shown in FIG. 27. Referring to FIG. 27, Ton may be determined using the output feedback error amplifier 212 of the controller 210.

Of course, other controller configurations may also be used. The controller may be implemented in any combination of discrete and integrated components, digitally or analogue, or in a platform such as a field programmable gate array (FPGA), as known in the art.

Equivalents

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A two-phase asymmetrical three-level buck converter, comprising:
a first input terminal connected to a first common terminal of a first switch connected in parallel with a third switch;
a first node connected to a second common terminal of the first and third switches, and to a first common terminal of a second switch connected in parallel with a fourth switch;
a second common terminal of the second and fourth switches connected to a second node and a first terminal of a fifth switch;
a first capacitor having a first terminal connected to the first node and a second terminal connected to a third node and a first terminal of a sixth switch;
a first inductor having a first terminal connected to the second node and a second terminal connected to a main output terminal;
a second inductor having a first terminal connected to the third node and a second terminal connected to the main output terminal;
a common node connected to a second input terminal, a second terminal of the sixth switch, a second terminal of the fifth switch, and a second output terminal;
a second capacitor connected between the main output terminal and the second output terminal; and
a controller that provides a driving signal for each of the first to sixth switches so that the first, second, third, and fourth switches are turned on and off once, sequentially, during one switching cycle and the fifth switch and the sixth switch are each turned on and off twice during one switching cycle.

2. The two-phase asymmetrical three-level buck converter of claim 1, comprising:
a DC power supply connected across the first input terminal and the second input terminal.

3. The two-phase asymmetrical three-level buck converter of claim 1, wherein the controller drives the first to sixth switches so that:
the first, second, third, and fourth switches are driven with 90° phase difference from each other;
the fifth switch is driven complementarily to the second and fourth switches; and
the sixth switch is driven complementarily to the first and third switches.

4. The two-phase asymmetrical three-level buck converter of claim 1, wherein the controller drives the first to sixth switches so that:
the first, second, third, and fourth switches are turned on and off once, sequentially, during one switching cycle, wherein a duty cycle of each of the first to fourth switches is prolonged such that successive on times of the first, second, third, and fourth switches overlap by a selected interval; and the fifth switch and the sixth switch are each turned on and off twice during a switching cycle;

wherein the fifth and sixth switches are off during the overlaps of the on times of the first to fourth switches.

5. A controller for a two-phase asymmetrical three-level buck converter, comprising:

an input that receives a signal corresponding to the converter output voltage or current;

a circuit that generates a duty cycle signal based on the sensed output voltage or current;

a driving circuit that generates gate drive signals for switches of the converter;

wherein the converter is the two-phase asymmetrical three-level buck converter of claim 1;

wherein the controller drives the first to sixth switches so that:

the first, second, third, and fourth switches are turned on and off once, sequentially, during one switching cycle, wherein a duty cycle of each of the first to fourth switches is prolonged such that successive on times of the first, second, third, and fourth switches overlap by a selected interval; and the fifth switch and the sixth switch are each turned on and off twice during a switching cycle;

wherein the fifth and sixth switches are off during the overlaps of the on times of the first to fourth switches.

6. The controller of claim 5, wherein increasing the selected interval of the overlap of the successive on times of the first to fourth switches increases the output voltage of the two-phase asymmetrical three-level buck converter.

7. A controller for a series capacitor buck converter comprising first and second control switches and first and second synchronous rectifier (SR) switches, the controller comprising:

an input that receives a signal corresponding to the converter output voltage or current;

a circuit that generates a duty cycle signal based on the sensed output voltage or current;

a driving circuit that generates gate drive signals for switches of the converter;

wherein the controller drives the switches so that:

the first and second control switches are turned on and off once, sequentially, during one switching cycle, wherein a duty cycle of each of the first and second control switches is greater than 50% such that the on times of the first and second control switches overlap by a selected interval; and the first and second SR switches are each turned on and off once, sequentially, during a switching cycle, wherein each of the on times of the first and second SR switches coincides with an off time of one of the first and second control switches;

wherein the first and second SR switches are off during the overlaps of the on times of the first and second control switches.

8. The controller of claim 7, wherein increasing the duty cycle above 50% increases the output voltage of the series capacitor buck converter.

9. A method for controlling a series capacitor buck converter comprising first and second control switches and first and second synchronous rectifier (SR) switches, comprising controlling the switches so that:

the first and second control switches are turned on and off once, sequentially, during one switching cycle, wherein a duty cycle of each of the first and second control switches is greater than 50% such that the on times of the first and second control switches overlap by a selected interval; and the first and second SR switches are each turned on and off once, sequentially, during a switching cycle, wherein each of the on times of the first and second SR switches coincides with an off time of one of the first and second control switches;

wherein the first and second SR switches are off during the overlaps of the on times of the first and second control switches.

10. A series capacitor buck converter comprising the controller of claim 7.

11. A method for controlling the two-phase asymmetrical three-level buck converter of claim 1, comprising controlling the first to sixth switches so that:

the first, second, third, and fourth switches are turned on and off once, sequentially, during one switching cycle, wherein a duty cycle of each of the first to fourth switches is prolonged such that successive on times of the first, second, third, and fourth switches overlap by a selected interval; and the fifth switch and the sixth switch are each turned on and off twice during a switching cycle;

wherein the fifth and sixth switches are off during the overlaps of the on times of the first to fourth switches.

12. The method of claim 11, wherein increasing the selected interval of the overlap of the successive on times of the first to fourth switches increases an output voltage of the two-phase asymmetrical three-level buck converter.

13. The method of claim 9, wherein increasing the duty cycle above 50% increases an output voltage of the series capacitor buck converter.

* * * * *